US011379751B1

(12) United States Patent
Zeng et al.

(10) Patent No.: US 11,379,751 B1
(45) Date of Patent: Jul. 5, 2022

(54) QUANTUM COMPUTING IN A THREE-DIMENSIONAL DEVICE LATTICE

(71) Applicant: Rigetti & Co, LLC, Berkeley, CA (US)

(72) Inventors: William J. Zeng, Berkeley, CA (US); Chad Tyler Rigetti, Walnut Creek, CA (US)

(73) Assignee: Rigetti & Co, LLC, Berkeley, CA (US)

( * ) Notice: Subject to any disclaimer, the term of this patent is extended or adjusted under 35 U.S.C. 154(b) by 0 days.

(21) Appl. No.: 16/951,016

(22) Filed: Nov. 18, 2020

Related U.S. Application Data

(63) Continuation of application No. 16/372,020, filed on Apr. 1, 2019, now Pat. No. 10,878,332, which is a continuation of application No. 15/167,411, filed on May 27, 2016, now Pat. No. 10,248,491.

(60) Provisional application No. 62/168,539, filed on May 29, 2015.

(51) Int. Cl.
*G06F 11/00* (2006.01)
*G06N 10/00* (2022.01)

(52) U.S. Cl.
CPC .................... *G06N 10/00* (2019.01)

(58) Field of Classification Search
CPC ...................................... G06N 10/00
See application file for complete search history.

(56) References Cited

U.S. PATENT DOCUMENTS

| | | | |
|---|---|---|---|
| 6,900,456 B2 | 5/2005 | Blais et al. | |
| 7,307,275 B2 | 12/2007 | Lidar et al. | |
| 7,529,717 B2 * | 5/2009 | Vala | B82Y 10/00 706/14 |
| 7,655,850 B1 | 2/2010 | Ahn | |
| 7,849,122 B2 | 12/2010 | Fiorentino et al. | |
| 7,876,145 B2 | 1/2011 | Koch | |
| 7,932,515 B2 | 4/2011 | Bunyk | |
| 7,966,549 B2 * | 6/2011 | Hollenberg | G06N 10/00 714/764 |
| 8,195,596 B2 * | 6/2012 | Rose | B82Y 10/00 706/62 |

(Continued)

FOREIGN PATENT DOCUMENTS

| | | | |
|---|---|---|---|
| WO | 2015178990 A2 | 11/2015 | |
| WO | 2015178991 A2 | 11/2015 | |
| WO | 2015178992 A2 | 11/2015 | |

OTHER PUBLICATIONS

USPTO, Restriction Requirement dated Mar. 1, 2018, in U.S. Appl. No. 15/167,411.

(Continued)

*Primary Examiner* — Esaw T Abraham
(74) *Attorney, Agent, or Firm* — Henry Patent Law Firm

(57) ABSTRACT

In a general aspect, information is encoded in data qubits in a three-dimensional device lattice. The data qubits reside in multiple layers of the three-dimensional device lattice, and each layer includes a respective two-dimensional device lattice. A three-dimensional color code is applied in the three-dimensional device lattice to detect errors in the data qubits residing in the multiple layers. A two-dimensional color code is applied in the two-dimensional device lattice in each respective layer to detect errors in one or more of the data qubits residing in the respective layer.

28 Claims, 16 Drawing Sheets

(56) References Cited

U.S. PATENT DOCUMENTS

| | | | |
|---|---|---|---|
| 8,209,279 | B2 | 6/2012 | Freedman et al. |
| 8,560,282 | B2 | 10/2013 | Macready et al. |
| 8,642,998 | B2 | 2/2014 | Gambetta et al. |
| 8,659,007 | B2 | 2/2014 | Bonderson et al. |
| 8,816,325 | B2 | 8/2014 | Schenkel et al. |
| 8,872,360 | B2 | 10/2014 | Chow et al. |
| 9,111,230 | B2 * | 8/2015 | Gambetta ............. B82Y 10/00 |
| 9,219,298 | B2 | 12/2015 | Abraham et al. |
| 9,306,740 | B2 | 4/2016 | Bowes |
| 9,495,644 | B2 | 11/2016 | Chudak et al. |
| 9,524,470 | B1 | 12/2016 | Chow et al. |
| 9,858,531 | B1 * | 1/2018 | Monroe ................. G06F 15/76 |
| 10,248,491 | B1 | 4/2019 | Zeng et al. |
| 10,878,332 | B1 | 12/2020 | Zeng et al. |
| 2004/0109631 | A1 | 6/2004 | Franson |
| 2006/0169877 | A1 | 8/2006 | Goto et al. |
| 2008/0215850 | A1 * | 9/2008 | Berkley ................. B82Y 10/00 712/1 |

OTHER PUBLICATIONS

USPTO, Non-Final Office Action dated Apr. 14, 2020, in U.S. Appl. No. 16/372,020, 17 pgs.

USPTO, Non-Final Office Action dated Jun. 7, 2018, in U.S. Appl. No. 15/167,411, 20 pgs.

USPTO, Notice of Allowance dated Nov. 9, 2018, in U.S. Appl. No. 15/167,411, 8 pgs.

USPTO, Notice of Allowance dated Oct. 30, 3020, in U.S. Appl. No. 16/372,020, 9 pgs.

Anderson, J. T., "Homological Stabilizer Codes", 1107.3502v2 [quant-ph], Aug. 10, 2011, 15 pgs.

Andrist, R. S., et al., "Optimal Error Correction in Topological Subsystem Codes", arXiv:1204.1838v2 [quant-ph], May 14, 2012, 4 pgs.

Bombin, H., "Dimensional Jump in Quantum Error Correction", arXiv:1412.5079v2 [quant-ph], Nov. 12, 2015, 10 pgs.

Bombin, H., "Dimensional Jump in Quantum Error Correction", arXiv:1412.5079v1 [quant-ph], Dec. 16, 2014, 4 pgs.

Bombin, Hector, "Gauge Color Codes: Optimal Transversal Gates and Gauge Fixing in Topological Stabilizer Codes", arXiv:1311.0879v6 [quant-ph], Aug. 6, 2015, 10 pages.

Bombin, H., "Gauge Color Codes: Optimal Transversal Gates and Gauge Fixing in Topological Stabilizer Codes", arXiv:1311 0879v6 [quant-ph],, Aug. 6, 2015, 10 pgs.

Bombin, H., "Single-shot fault-tolerant quantum error correction", arXiv:1404.5504v2 [quant-ph], Dec. 16, 2014, 19 pgs.

Bombin, H., "Single-shot fault-tolerant quantum error correction", arXiv:1404.5504v4 [quant-ph], Sep. 25, 2015, 26 pgs.

Bombin, H., et al., "Topological Color Codes", Accessed online Apr. 19, 2016: http://qserver.usc.edu/qec07/QEC07/HectorBombin.pdf, 21 pgs.

Bombin, H., et al., "Topological Computation without Braiding", arXiv:quant-ph/0610024v2, Mar. 29, 2007, 4 pgs.

Bombin, H., "Topological Subsystem Codes", arXiv:0908.4246v2 [quant-ph], Feb. 17, 2010, 16 pgs.

Brown, B. J., "Fault Tolerance with the Gauge Color Code", arXiv:1503.08217v1 [quant-ph], Mar. 27, 2015, 9 pgs.

Brown, B. J., "Fault-Tolerant Error Correction with the Gauge Color Code", arXiv:1503.08217v2 [quant-ph], Aug. 3, 2015, 11 pgs.

Brown, B. J., et al., "Quantum Memories at Finite Temperature", arXiv:1411.6643v1 [quant-ph], Nov. 24, 2014, 48 pgs.

Corcoles, A. D., et al., "Demonstration of a quantum error detection code using a square lattice of four superconducting qubits, Nature Communications", DOI: 10.1038/ncomms7979, Apr. 29, 2015, 10 pgs.

Fowler, Austin G., "2D color code quantum computation", arXiv:0806.4827v3 [quant-ph], Jan. 10, 2011, 9 pages.

Fowler, Austin G., "Surface codes: Towards practical large-scale quantum computation", Physical Review A 86, 032324, Sep. 18, 2012, 48 pages.

Jochym-O'Connor, T., et al., "Stacked codes: universal fault-tolerant quantum computation in a two-dimensional ayout", arXiv:1509.04255v1 [quant-ph], Sep. 14, 2015, 15 pgs.

Kelly, J., et al., "State preservation by repetitive error detection in a superconducting quantum circuit", arXiv:1411 7403v1, Nov. 26, 2014, 32 pgs.

Kubica, Aleksander, et al., "Unfolding the Color Code", New Journal of Physics 17, 083026, Aug. 13, 2015, 26 pages.

Kubica, A., "Unfolding the Color Code", arXiv:1503.02065v1 [quant-ph], Mar. 6, 2015, 46 pgs.

Kubica, A., et al., "Universal transversal gates with color codes—a simplified approach", arXiv:1410.0069v1 [quant-ph], Sep. 30, 2014, 13 pgs.

Landahl, Andrew J., et al., "Fault-tolerant quantum computing with color codes", arXiv:1108.5738v1 [quant-ph], Aug. 29, 2011, 28 pages.

Landahl, A. J., "Quantum computing by color-code lattice surgery", arXiv:1407.5103v1 [quant-ph], Jul. 18, 2014, 13 pgs.

Paetznick, A., et al., "Universal fault-tolerant quantum computation with only transversal gates and error correction", arXiv:1304.3709v2 [quant-ph], Sep. 4, 2013, 5 pgs.

* cited by examiner

QUANTUM COMPUTING IN A THREE-DIMENSIONAL DEVICE LATTICE

CROSS-REFERENCE TO RELATED APPLICATIONS

This application is a continuation of U.S. patent application Ser. No. 16/372,020, filed Apr. 1, 2019, issued as U.S. Pat. No. 10,878,332 On Dec. 29, 2020, entitled "Quantum Computing in a Three-Dimensional Device Lattice" which is a continuation of U.S. patent application Ser. No. 15/167,411, filed May 27, 2016, issued as U.S. Pat. No. 10,248,491 Apr. 2, 2019, entitled "Quantum Computing in a Three-Dimensional Device Lattice." which are hereby incorporated by reference and which claim priority to U.S. Provisional Application No. 62/168,539, filed May 29, 2015.

BACKGROUND

The following description relates to quantum computing in a three-dimensional device lattice.

Quantum computing generally involves storage or processing of information in quantum mechanical states of light or matter. Information stored in these systems can display the quantum properties of the storage medium. These properties are different from classical Newtonian laws of physics that govern classical computing hardware. Significant evidence shows that the quantum computing paradigm allows certain advantages; for example, some problems can be solved by a quantum computer using exponentially fewer resources (e.g., time, memory size, energy) than would be used by the best known classical algorithms and computing systems. Error correcting codes have been proposed to implement fault-tolerant quantum computing and improve the performance of a quantum computing system.

DETAILED DESCRIPTION

In some aspects of what is described here, quantum computing is performed by operating a quantum processor cell that includes a three-dimensional device. In some instances, the quantum processor cell can be operated in a fault-tolerant regime.

In some of the examples described here, a three-dimensional gauge color code (e.g., a three-dimensional gauge color code, or other three-dimensional color code) is applied to a three-dimensional device lattice to process quantum information (in some cases, fault-tolerantly) in layers of the three-dimensional device lattice. Each layer of the three-dimensional device lattice can be or include a two-dimensional device lattice, and a two-dimensional color code can be applied to the two-dimensional device lattice to process information (in some cases, fault-tolerantly) within a single layer. In some instances, the quantum processor cell can switch between applying quantum error correction with a three-dimensional color code (applied to a three-dimensional device lattice) and applying quantum error correction with two-dimensional color codes (applied to two-dimensional device lattices). The switching can be performed, in some implementations, without interrupting the fault-tolerant operation of the quantum processor cell. In some cases, the switching is used to perform a universal set of fault-tolerant gates in the quantum processor cell.

Figure 1:
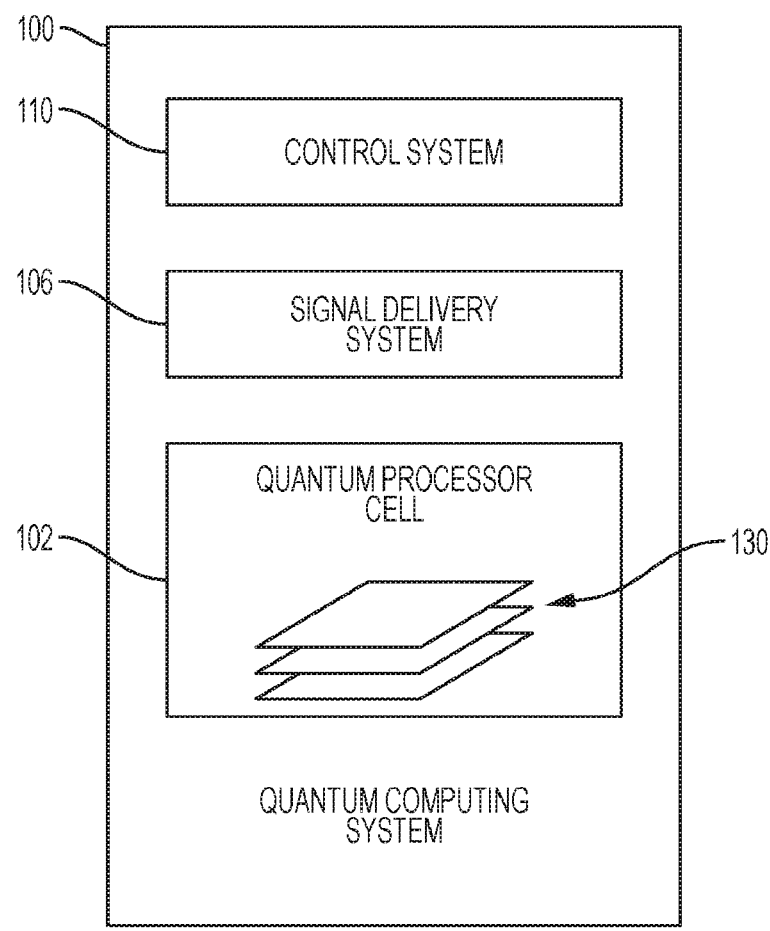
FIG. 1 is a block diagram of an example quantum computing system.

FIG. 1 is a schematic diagram of an example quantum computing system 100. The example quantum computing system 100 shown in FIG. 1 includes a control system 110, a signal delivery system 106, and a quantum processor cell 102. A quantum computing system may include additional or different features, and the components of a quantum computing system may operate as described with respect to FIG. 1 or in another manner.

The example quantum computing system 100 shown in FIG. 1 can perform quantum computational tasks by executing quantum algorithms. In some implementations, the quantum computing system 100 can perform quantum computation by storing and manipulating information within individual quantum states of a composite quantum system. For example, qubits (i.e., quantum bits) can be stored in and represented by an effective two-level sub-manifold of a quantum coherent physical system. Coupler devices can be used to perform quantum logic operations on single qubits or conditional quantum logic operations on multiple qubits. In some instances, the conditional quantum logic can be performed in a manner that allows large-scale entanglement within the quantum computing system. Control signals can manipulate the quantum states of individual qubits and the joint states of multiple qubits. In some instances, information can be read out from the composite quantum system by measuring the quantum states of the individual qubits.

In some implementations, the quantum computing system 100 can operate using gate-based models for quantum computing. In some models, fault-tolerance can be achieved by applying a set of control and measurement operations to the qubits. For example, topological quantum error-correction schemes can operate on a lattice of nearest-neighbor-coupled qubits. In some instances, these and other types of quantum error-correcting schemes can be adapted for a two- or three-dimensional lattice of nearest-neighbor-coupled qubits, for example, to achieve fault-tolerant quantum computation. The lattice can allow each qubit to be independently controlled and measured without introducing errors on other qubits in the lattice. Adjacent pairs of qubits in the lattice can be addressed, for example, with two-qubit gate operations that are capable of generating entanglement, independent of other pairs in the lattice.

In some implementations, the quantum computing system 100 is constructed and operated according to a scalable quantum computing architecture. For example, in some cases, the architecture can be scaled to a large number of qubits to achieve largescale general purpose coherent quantum computing. In some instances, the architecture is adaptable and can incorporate a variety of modes for each technical component. For example, the architecture can be adapted to incorporate different types of qubit devices, coupler devices, readout devices, signaling devices, etc.

The example quantum processor cell 102 shown in FIG. 1 includes a three-dimensional device lattice 130. The quantum processor cell 102 may be implemented according to the example quantum processor cell 102A shown in FIG. 2, or in another manner. The three-dimensional device lattice 130 includes multiple devices whose collective spatial arrangement corresponds to a three-dimensional lattice structure. For example, the devices may be regularly spaced apart from one another and arranged in a repeating spatial pattern within the quantum processor cell 102; the repeating spatial pattern may have translational symmetry in one or more spatial dimensions of the three-dimensional device lattice 130. The three-dimensional device lattice 130 can be a composite of multiple two-dimensional layers. For example, each two-dimensional layer can extend in two horizontal directions (e.g., the x-direction and y-direction of a Cartesian coordinate system), and the two-dimensional layers can be assembled in a vertical direction (e.g., the z-direction of a Cartesian coordinate system) to form the three-dimensional device lattice 130. The layers of the three-dimensional device lattice 130 shown in FIG. 1 can each include a two-dimensional device lattice. For example, each layer of the three-dimensional device lattice 130 may be implemented according to the example two-dimensional device lattices 500, 600, 800 shown in FIG. 5, 6, 8, respectively, or the layers may be implemented in another manner.

The devices in the three-dimensional device lattice 130 can include qubit devices (e.g., data qubit devices, ancilla qubit devices), coupler devices, readout devices and possibly other types of devices. For instance, quantum processor cell 102 may include data qubit devices that are used to store and process quantum information, and ancilla qubit devices that are used to detect errors. In the example quantum processor cell 102, the qubit devices each store a single qubit (a bit of quantum information), and the data qubit devices can collectively define a computational state. The quantum processor cell 102 may also include readout devices that selectively interact with the qubit devices to detect their quantum states. For example, the readout devices may generate readout signals that indicate the computational state of the quantum processor or quantum memory. The quantum processor cell 102 may also include coupler devices that selectively operate on individual qubits or pairs of qubits. For example, the coupler devices may produce entanglement or other multi-qubit states over two or more qubits in the quantum processor cell 102.

In some implementations, the example quantum processor cell 102 can process the quantum information stored in the qubits by applying control signals to the qubit devices or to the coupler devices housed in the quantum processor cell. The control signals can be configured to encode information in the qubit devices, to process the information by performing logical gates or other types of operations, or to extract information from the qubit devices. In some examples, the operations can be expressed as single-qubit gates, two-qubit gates, or other types of logical gates that operate on one or more qubits. A sequence of operations can be applied to the qubits to perform a quantum algorithm. The quantum algorithm may correspond to a computational task, a quantum error-correction procedure, a quantum state distillation procedure, or a combination of these and other types of operations.

In the example shown in FIG. 1, the signal delivery system 106 provides communication between the control system 110 and the quantum processor cell 102. For example, the signal delivery system 106 can receive control signals (e.g., qubit control signals, readout control signals, coupler control signals, etc.) from the control system 110 and deliver the control signals to the quantum processor cell 102. In some instances, the signal delivery system 106 performs preprocessing, signal conditioning, or other operations to the control signals before delivering them to the quantum processor cell 102.

In the example quantum computing system 100 shown in FIG. 1, the control system 110 controls operation of the quantum processor cell 102. The example control system 110 may include data processors, signal generators, interface components and other types of systems or subsystems. In some cases, the control system 110 includes one or more classical computers or classical computing components.

In some implementations, the control system 110 includes a classical computing system that executes software to compile instructions for the quantum processor cell 102. For example, the control system 110 may decompose a quantum logic circuit into discrete control operations or sets of control operations that can be executed by the hardware in the quantum processor cell 102. In some examples, that control system applies a quantum logic circuit by causing the qubit devices and other devices in the quantum processor cell 102 to execute operations. For instance, the operations may correspond to single-qubit gates, two-qubit gates, qubit measurements, etc. The control system 110 can generate control signals that are communicated to the quantum processor cell 102 by the signal delivery system 106, and the devices in the quantum processor cell 102 execute the operations in response to the control signals. In some implementations, the control system 110 applies a quantum error correcting code to the qubit devices in the quantum processor cell. Quantum error correcting codes include surface codes and color codes.

In some aspects of operation, information is encoded in data qubits residing in multiple layers of the three-dimensional device lattice 130. For example, a single qubit of information may be written to, stored on or otherwise encoded in each data qubit. In some cases, to encode information in the data qubits, the control system 110 sends control signals to the quantum processor cell 102. The control signals can each be addressed to individual data qubits, and can be configured to modify the quantum states of the respective data qubits to which they are addressed. For example, the control signals may be configured to transit the data qubits to a particular computational state, to apply logical operations to the data qubits, or to otherwise encode information in the data qubits. In some cases, information can be encoded in the data qubits in another manner, for example, by a cooling process, a thermal process, etc. The information encoded in the data qubits can then be processed, for example, by applying a quantum circuit to the data qubits. In some instances, quantum error correcting codes are applied to detect (and in some instances, to correct) errors that occur, for example, as a result of noise processes acting on the data qubits.

In some examples, the control system 110 applies a two-dimensional color code to qubits in an individual layer of the three-dimensional device lattice 130, for example, to detect (and in some instances, to correct) errors in one or more of the data qubits residing in the individual layer. The two-dimensional color code can be considered a stabilizer code on a three-valent, three-colorable lattice, where data qubits operate at the vertices of a color code lattice. The stabilizers of the code can be implemented as parity measurements on faces of the color code lattice. The syndrome measurements of the code can be performed by measuring the stabilizers (e.g., X-stabilizers and Z-stabilizers) across the color code lattice, and the stabilizer measurements can be decoded using classical decoding algorithms.

In some examples, the control system 110 applies a three-dimensional color code to qubits in multiple layers of the three-dimensional device lattice 130, for example, to detect (and in some instances, to correct) errors in one or more of the data qubits residing in the layers. The three-dimensional color code can be considered a stabilizer code on a four-valent, four-colorable lattice, where data qubits operate at the vertices of a color code lattice. The stabilizers of the code can be implemented as parity measurements on the vertices of a cell. The syndrome measurements of the code can be performed by measuring the stabilizers (e.g., X-stabilizers and Z-stabilizers) across the color code lattice, and the stabilizer measurements can be decoded using classical decoding algorithms. In a three-dimensional gauge color code, for example, information from parity measurements on the faces of the color code lattice are used in decoding.

In some examples, the three-dimensional device lattice 130 can be used to apply gauge color codes, non-gauge color codes or possibly other types of color codes. During the operation of non-gauge color codes, measurements of stabilizer operators are made using ancilla qubits and data qubits in the three-dimensional device lattice 130. The stabilizer operators of a non-gauge color code are operators with support on the vertices of volumes in the color code lattice. During the operation of gauge color codes, measurements of gauge operators are made using ancilla qubits and data qubits in the three-dimensional device lattice 130. The gauge operators of a gauge color code are operators with support on the vertices of faces in the color code lattice.

Generally, a lattice of data qubits can be considered n-valent where each data qubit is directly connected with n other data qubits in the lattice. In some of the examples described here, a lattice is considered three-valent where each data qubit is directly connected with (exactly or at least) three other data qubits in the lattice, and a lattice is considered four-valent where each data qubit is directly connected with (exactly or at least) four other data qubits in the lattice. Data qubits that are directly connected in a lattice may be connected through circuitry or another type of device (e.g., an ancilla qubit device, a coupler device, or another device other than a data qubit device).

Generally, a lattice of data qubits can be considered n-colorable where each cell of the lattice can be colored with one of n distinct colors, and each cell of the lattice contacts only unlike-colored cells in the lattice. In some of the examples described here, a lattice is considered three-colorable where each cell of the lattice can be colored with exactly one of three distinct colors, and each cell in the lattice contacts only unlike-colored cells in the lattice; and a lattice is considered four-colorable where each cell of the lattice can be colored with one of four distinct colors, and each cell in the lattice contacts only unlike-colored cells in the lattice. Cells (also called "solids") in a lattice contact if they are adjacent in the lattice, for example, if they share an edge, vertex or face. For example, in an n-colorable lattice, none of the cells of the lattice share an edge, vertex or face with another cell of the same color.

In some implementations, the lattice that defines a color code can be mapped to the physical device lattice to which the color code is applied. For example, a three-dimensional color code can be defined in a three-dimensional lattice and mapped to the three-dimensional device lattice 130. The mapping can include, for example, dividing the three-dimensional lattice that defines the color code into multiple regions, and mapping the data qubits in each region to a physical (two-dimensional) layer of the three-dimensional device lattice 130. The data qubits in each region of the color code lattice (the three-dimensional lattice that defines the color code) may, in some cases, form a two-dimensional device lattice within a physical layer of the three-dimensional device lattice 130. An example is described with respect to FIGS. 3 and 5.

Figure 2:
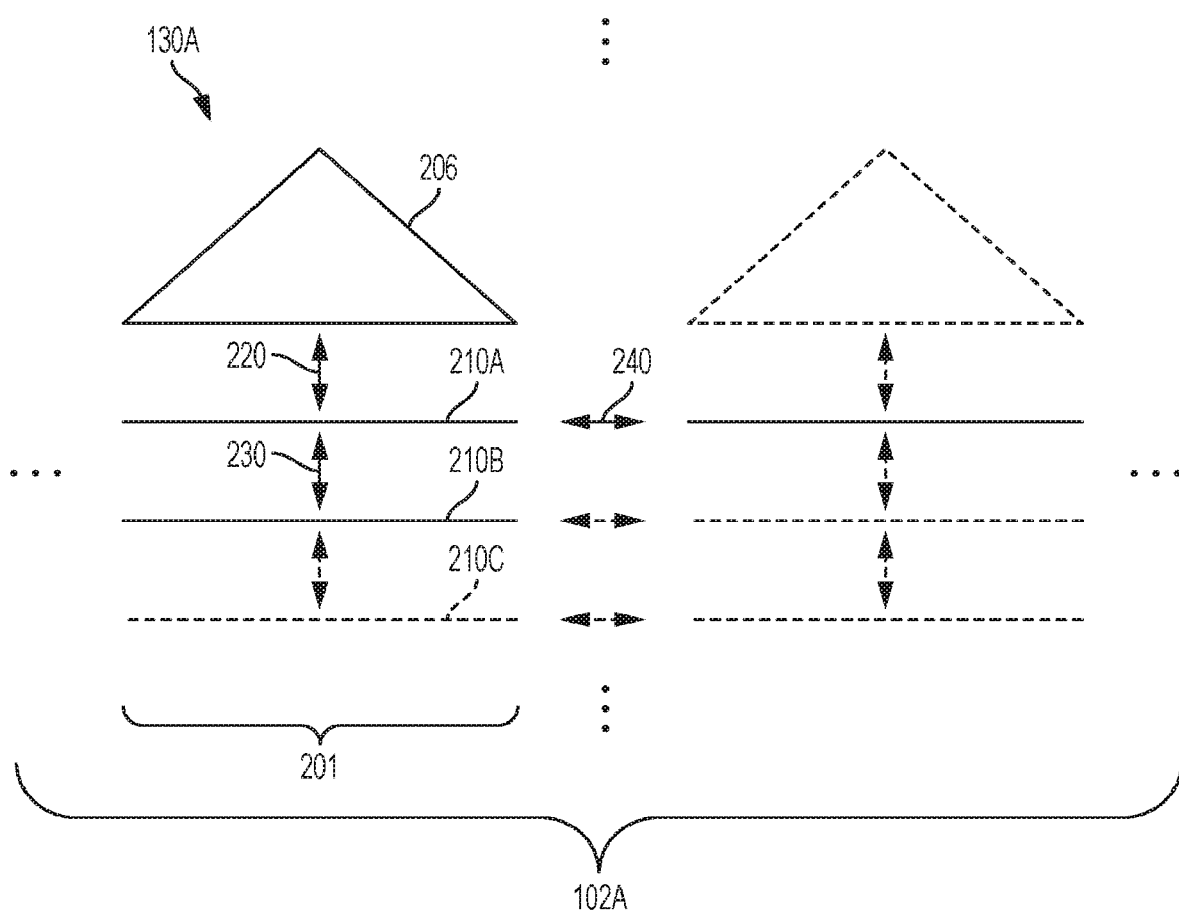
FIG. 2 is a block diagram showing functional operating regions in an example quantum processor cell.

FIG. 2 is a block diagram showing functional operating regions in an example quantum processor cell 102A. The example quantum processor cell 102A shown in FIG. 2 includes a three-dimensional device lattice 130A, which includes multiple functional operating regions. The functional operating regions shown in FIG. 2 include stacks, cap regions and planes; each stack includes multiple planes and at least one cap region. In some instances, these and other types of functional operating regions can be dynamically allocated (and reallocated) during the operation of the quantum processor cell 102A, for example, as discussed with respect to FIG. 16 or in another manner. For instance, the stack 201 includes a cap region 206 and three planes 210A, 210B, 210C. FIG. 2 shows two adjacent stacks in the three-dimensional device lattice 130A. The three-dimensional device lattice 130A may extend to include additional stacks, and the stacks may extend to include additional planes, cap regions or other functional operation regions.

In the example shown in FIG. 2, the cap region 206 includes a three-dimensional device lattice, which is a sub-lattice of the larger the three-dimensional device lattice 130A. The cap region 206 includes multiple layers of devices, including data qubits, and each layer includes a two-dimensional device lattice. In some instances, a three-dimensional color code can be applied to the three-dimensional device lattice in the cap region 206 to detect and correct errors in the data qubits residing in the three-dimensional device lattice. For example, the three-dimensional color codes 300, 400 described with respect to FIGS. 3 and 4, respectively, may be applied. In some instances, a two-dimensional color code can be applied to the two-dimensional lattice in individual layers within the cap region 206, to detect and correct errors in the data qubits residing in the individual layer. For example, the two-dimensional color code described with respect to FIG. 8 may be applied to each layer.

In the example shown in FIG. 2, each plane 210A, 210B, 210C includes a two-dimensional device lattice, which in this example is a sub-lattice of the larger the three-dimensional device lattice 130A. Each individual plane 210A, 210B, 210C includes a layer of devices, which include data qubits. In some instances, a two-dimensional color code can be applied in the two-dimensional device lattice in each respective plane 210A, 210B, 210C to detect errors in one or more of the data qubits residing in the respective plane.

In some instances, a quantum logic circuit is executed by the quantum processor cell 102A, and the quantum logic gates in the circuit can be executed within individual functional operating regions or across multiple functional operating regions. For instance, single-qubit gates (e.g., phase gates, not gates, etc.) can be applied to individual qubits, and two-qubit gates (e.g., controlled-phase gates, controlled-not gates, swap gates, etc.) can be applied to pairs of qubits in the same functional operating region or to pairs of qubits in multiple functional operating regions. In some implementations, a universal set of quantum logic gates can be performed fault-tolerantly in the quantum processor cell 102A. Examples of fault-tolerant universal sets of quantum logic gates are described with respect to FIGS. 14 and 15.

In some implementations, the quantum processor cell 102A in operation achieves universal fault-tolerant quantum computation without magic state distillation or long-range qubit interactions. For example, in some cases the quantum processor cell 102A can perform an encoded T-gate or other non-Clifford gate fault-tolerantly without magic state distillation. As another example, in some cases the quantum processor cell 102A can perform a universal set of quantum logic operations fault-tolerantly with data qubits that interact with neighboring data qubits and ancilla qubits. In some cases, the quantum processor cell 102A may achieve other advantages.

Figure 12:
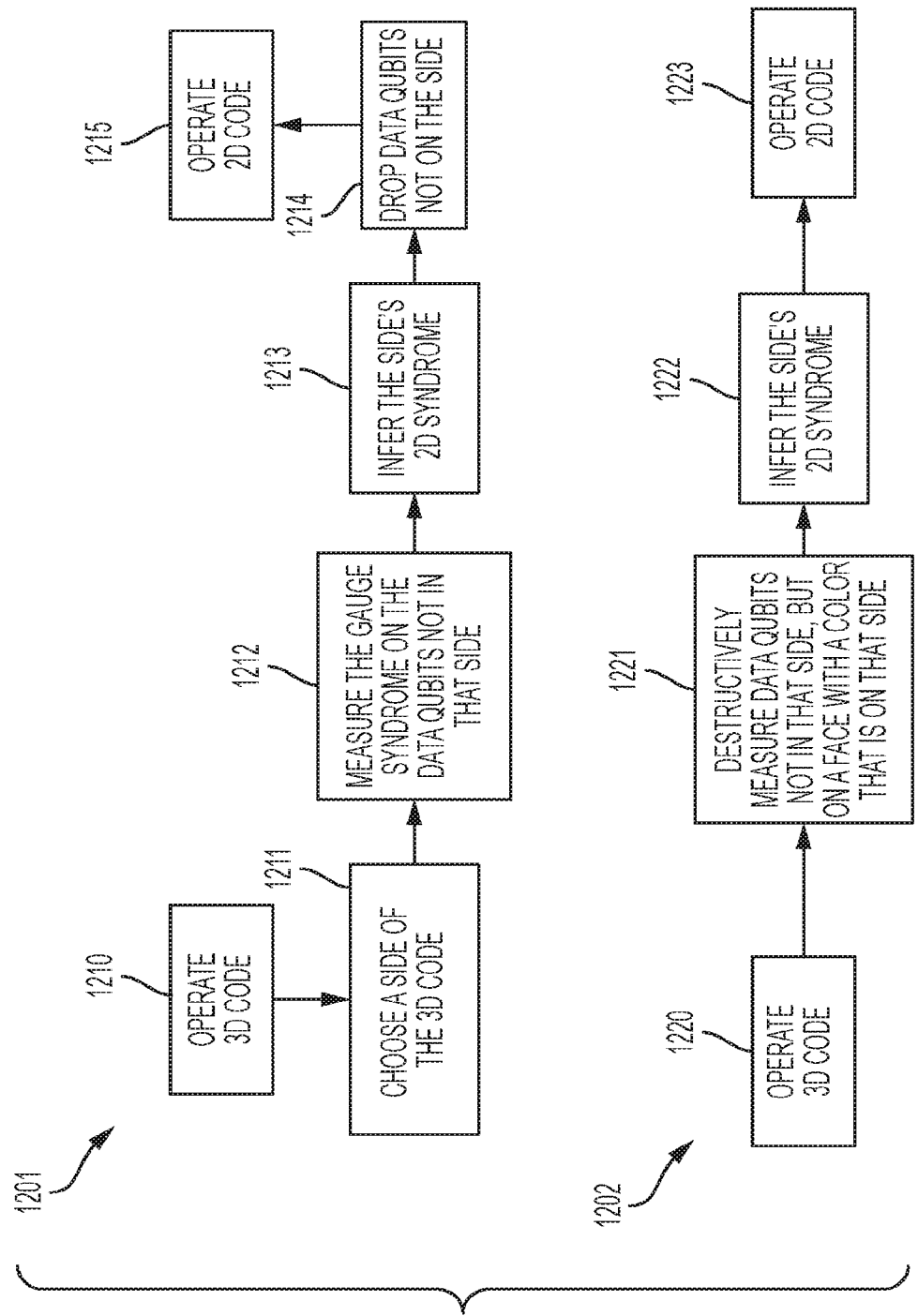
FIG. 12 includes two flow charts showing example techniques for dimensional reduction of an error correcting code.
Figure 13:
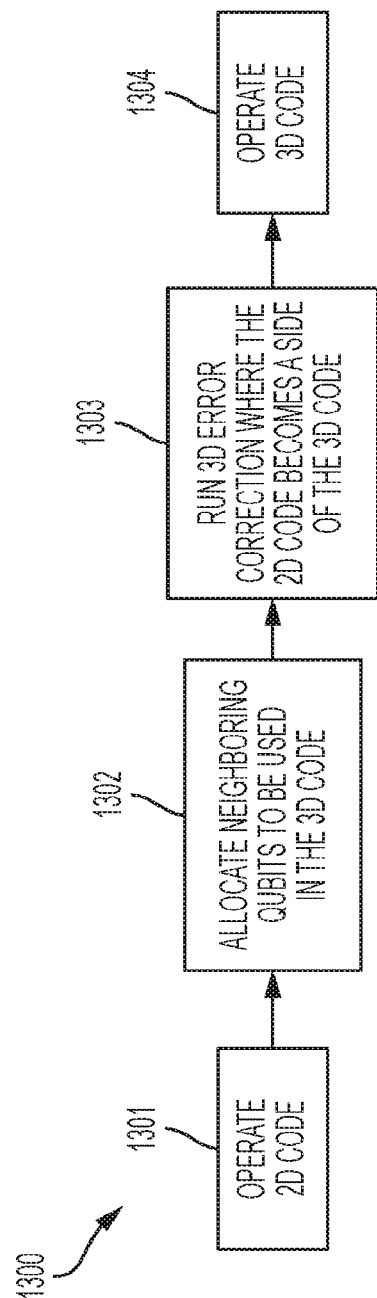
FIG. 13 is a flow chart showing an example technique for dimensional extension.
Figure 14:
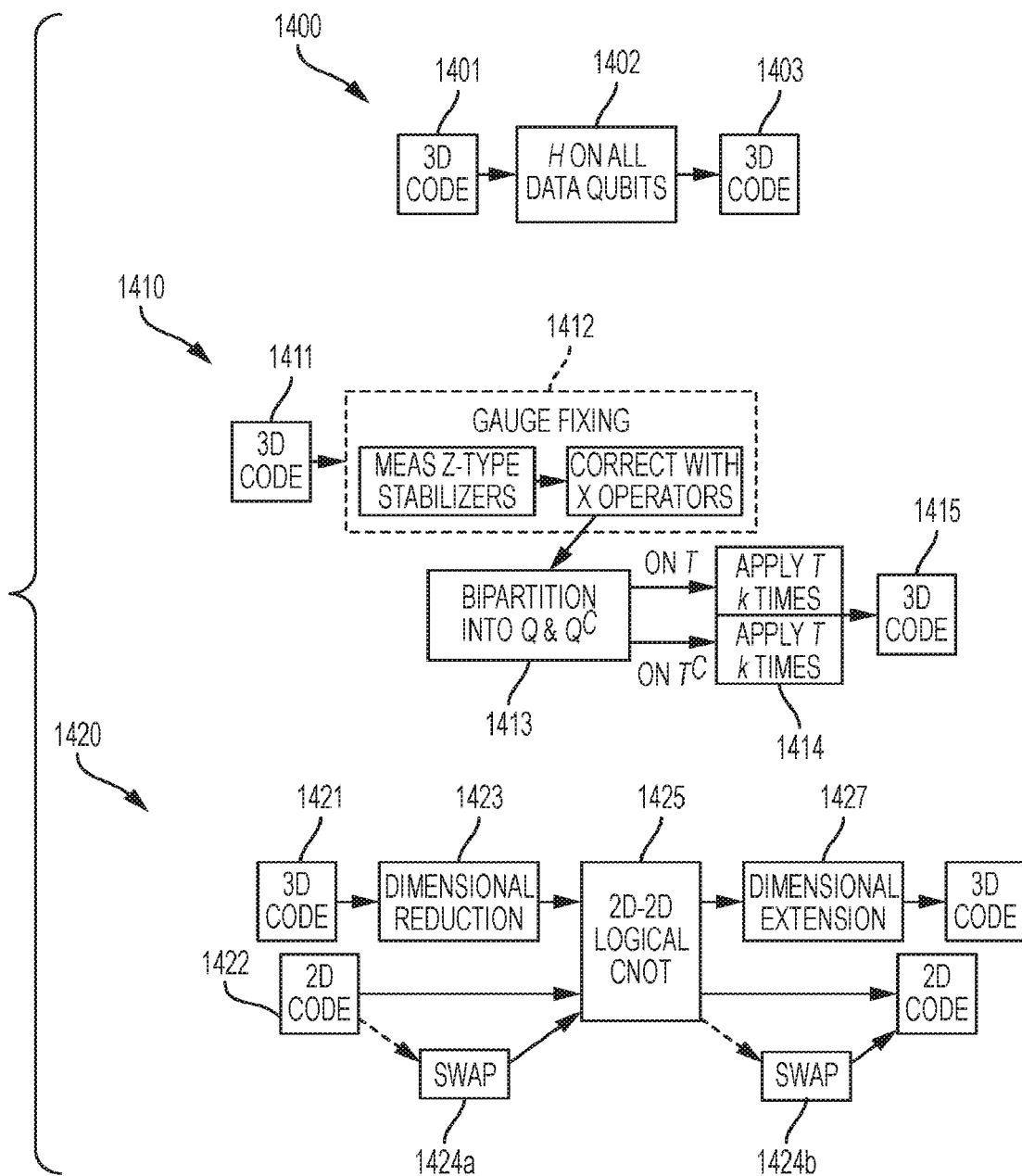
FIG. 14 includes three flow charts showing example techniques for performing quantum logic gates encoded in a three-dimensional operating mode of a quantum processor cell.
Figure 15:
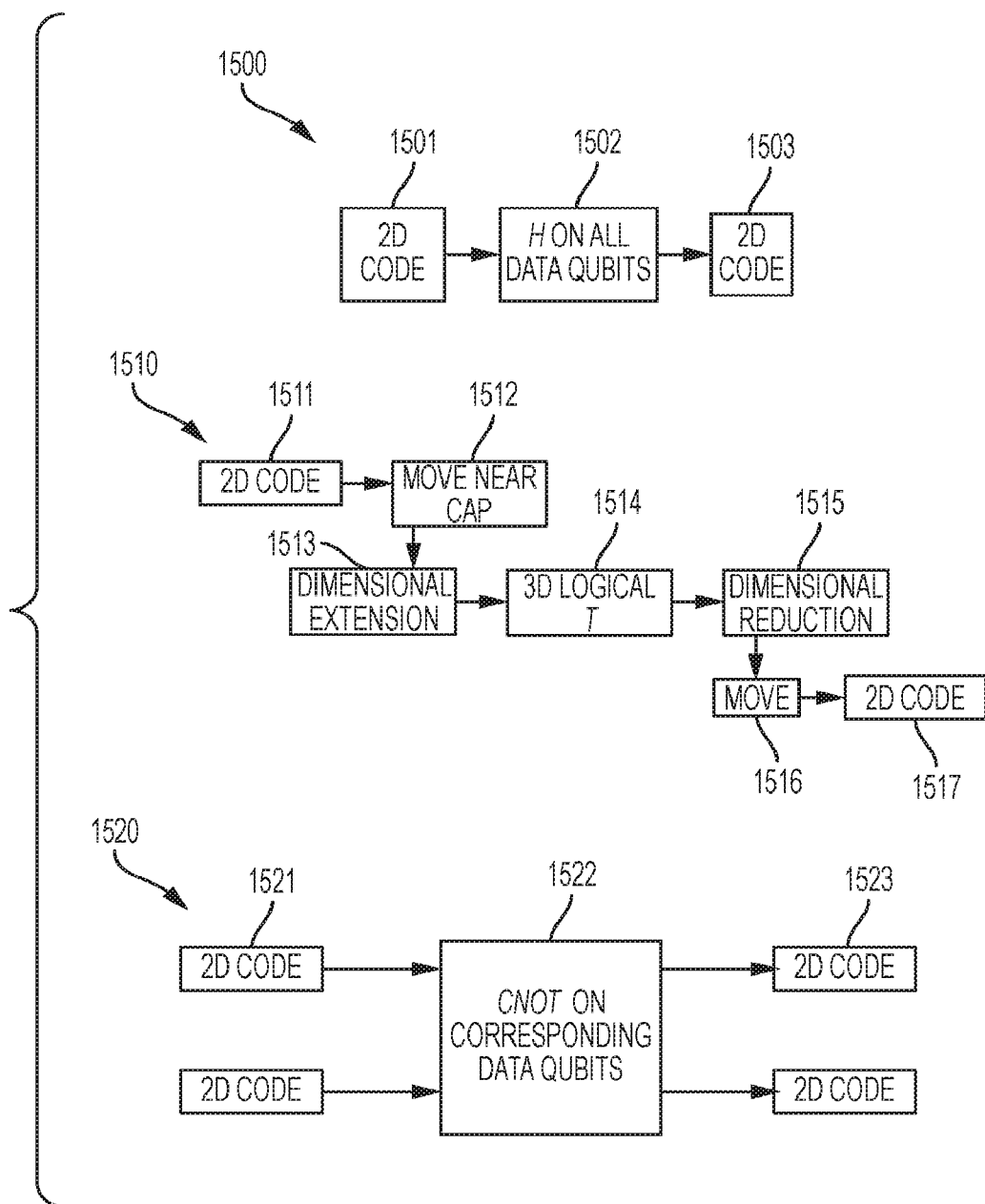
FIG. 15 includes three flow charts showing example techniques for performing quantum logic gates encoded in a two-dimensional operating mode of a quantum processor cell.

FIG. 2 shows examples of operations that can be performed across multiple functional operating regions in the three-dimensional device lattice 130A. In some instances, transversal controlled-not gates 230 can be applied to a pair of qubits in planes 210A and 210B (e.g., where the control qubit resides in plane 210A and the target qubit resides in plane 210B). Example processes 1420, 1520 for performing the controlled-not gates 230 are shown in FIGS. 14 and 15. In some instances, dimensional extension or reduction operations 220 can be applied to plane 210A and cap region 206, for example, to transfer information between the qubit devices in the plane 210A and the qubit devices in the cap region 206. FIGS. 12 and 13 show example processes for performing the dimensional extension or reduction operations 220 to transfer information between the plane 210A to the cap region 206. In some instances, color code lattice surgery operations 240 can be applied to functional operating regions in two distinct stacks in the quantum processor cell 102A, for example, to perform controlled-not gates to a pair of qubits in the two functional operating regions. In some implementations, these and other operations can be performed fault-tolerantly in the quantum processor cell 102A.

Figure 3:
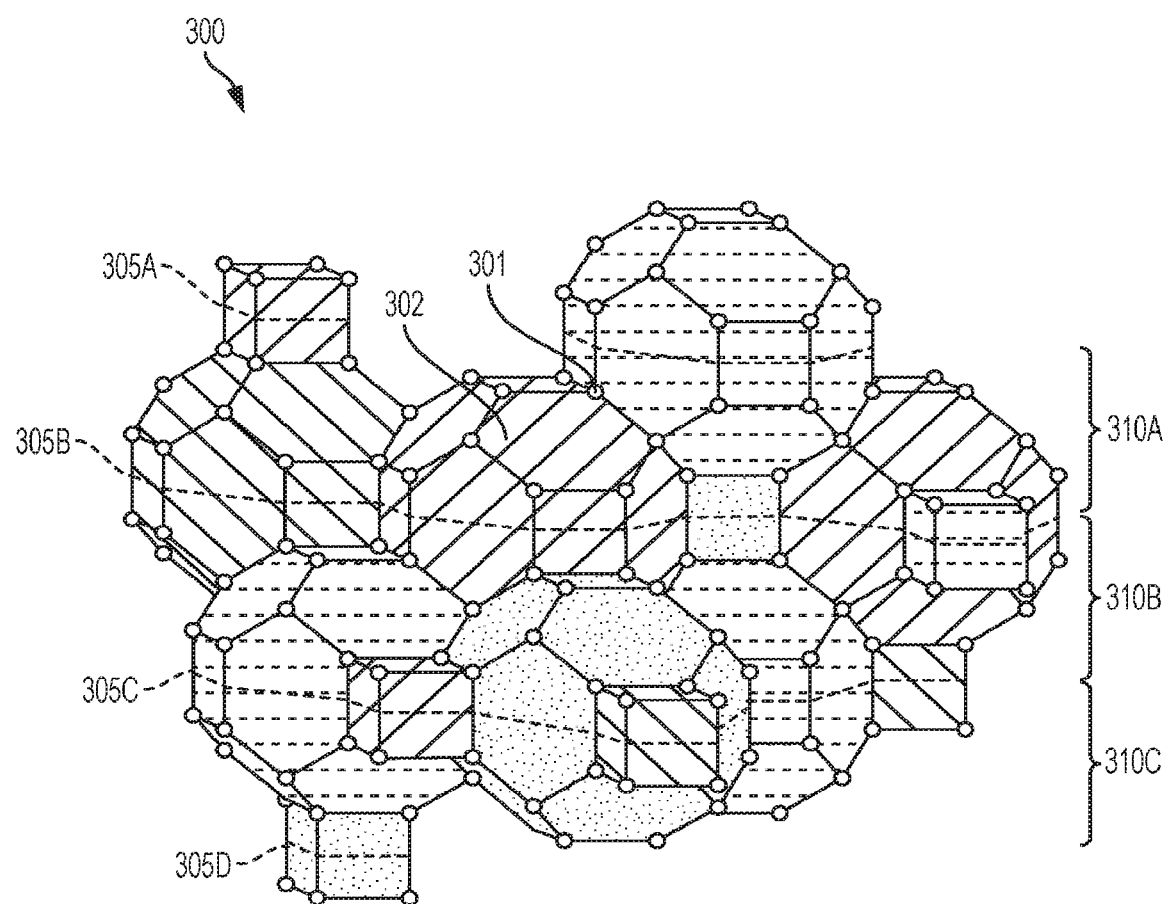
FIG. 3 is a diagram of an example three-dimensional gauge color code.

FIG. 3 is a diagram of an example three-dimensional gauge color code 300. The diagram in FIG. 3 shows a lattice of data qubits (e.g., data qubit 301) represented by small circles, with color faces (e.g., face 302) between the data qubits. There are four types of color faces in three-dimensional gauge color code 300, represented by the four types of hatching indicated in the legend in FIG. 3 ("red" faces; "blue" faces; "green" faces; "yellow" faces). The color faces can act as the gauge operators for the gauge color code. In FIG. 3, respective pairs of data qubit devices are connected by lines that form the edges in the lattice. The edges of the lattice (indicated by the connecting lines in FIG. 3) indicate couplings between adjacent data qubits, where two-qubit gates may be applied in some instances. The direct couplings between neighboring data may be implemented by circuitry, either with or without another type of device (e.g., an ancilla qubit, coupler, or other device) between them.

The example three-dimensional gauge color code 300 shown in FIG. 3 can be applied to a four-colorable, four-valent, three-dimensional device lattice. For example, the example three-dimensional gauge color code 300 can be applied to a three-dimensional lattice in which the layers are implemented according to the example two-dimensional device lattices 500, 600, 800 shown in FIG. 5, 6, 8, respectively.

The qubit devices in the example three-dimensional gauge color code 300 can be assigned to layers in the three-dimensional device lattice according to the cuts 305A, 305B, 305C, 305D shown in FIG. 3. For example, the qubit devices in the region 310A of the color code between cuts 305A and 305B can be assigned to a first individual layer in a three-dimensional device lattice; the qubit devices in the region 310B between cuts 305B and 305C can be assigned to a second individual layer adjacent to the first layer in the three-dimensional device lattice; and the qubit devices in the region 310C between cuts 305C and 305D can be assigned to a third individual layer adjacent to the second layer in the three-dimensional device lattice. In some examples, each layer of qubit devices (e.g. a layer formed from the qubit devices in any of the regions 310A, 310B, 310C) forms a two-dimensional device lattice. For instance, the qubit devices in the region 310A can form the example two-dimensional device lattices 500, 600, 800 shown in FIG. 5, 6, 8, respectively, or they may form another type of two-dimensional device lattice.

In some instances, the qubit devices in the three-dimensional gauge color code 300 can form a cap region (e.g., the cap region 206 in FIG. 2) within a three-dimensional device lattice. Accordingly, in some instances, the three-dimensional gauge color code 300 can be applied to a functional operating region within a quantum processor cell, for example, to the cap region 206 in the example quantum processor cell 102A shown in FIG. 2 or to another type of functional operating region.

Figure 4:
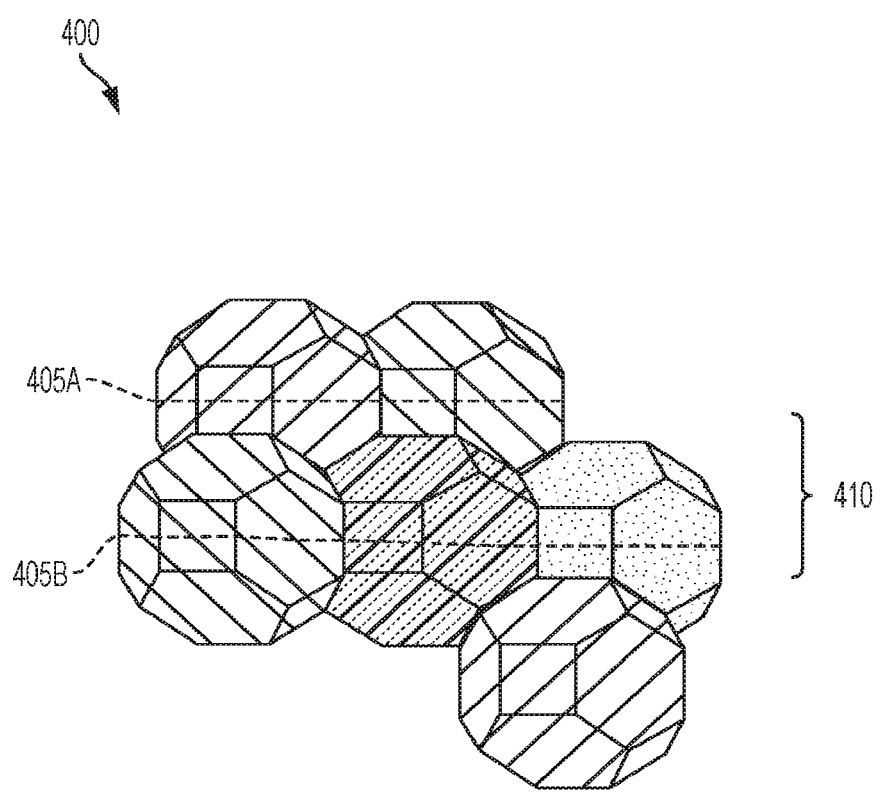
FIG. 4 is a diagram of another example three-dimensional gauge color code.

FIG. 4 is a diagram of another example three-dimensional gauge color code 400. The diagram in FIG. 4 shows a lattice of data qubits with color faces between the data qubits. The data qubits are represented by vertices of the lattice shown in FIG. 4. Similar to FIG. 3, there are four types of color faces in three-dimensional gauge color code 400 in FIG. 4, represented by the four types of hatching in FIG. 4. The color faces can act as the gauge operators for the gauge color code. Similar to FIG. 3, the edges of the lattice are represented by lines in FIG. 4, which indicate direct couplings between adjacent data qubits, where two-qubit gates may be applied in some instances.

The example three-dimensional gauge color code 400 shown in FIG. 4 can be applied to a four-colorable, four-valent, three-dimensional device lattice. In some cases, the qubit devices in the example three-dimensional gauge color code 400 can be assigned to layers in a three-dimensional device lattice according to the cuts 405A, 405B shown in FIG. 4. For example, the qubit devices in the region 410 of the color code between cuts 405A and 405B can be assigned to a first individual layer in a three-dimensional device lattice; etc. In some examples, each layer of qubit devices (e.g. a layer formed from the qubit devices in the region 410) forms a two-dimensional device lattice.

In some instances, the qubit devices in the three-dimensional gauge color code 400 can form a cap region (e.g., the cap region 206 in FIG. 2) within a three-dimensional device lattice. Accordingly, in some instances, the three-dimensional gauge color code 400 can be applied to a functional operating region within a quantum processor cell, for example, to the cap region 206 in the example quantum processor cell 102A shown in FIG. 2 or to another type of functional operating region.

Figure 5:
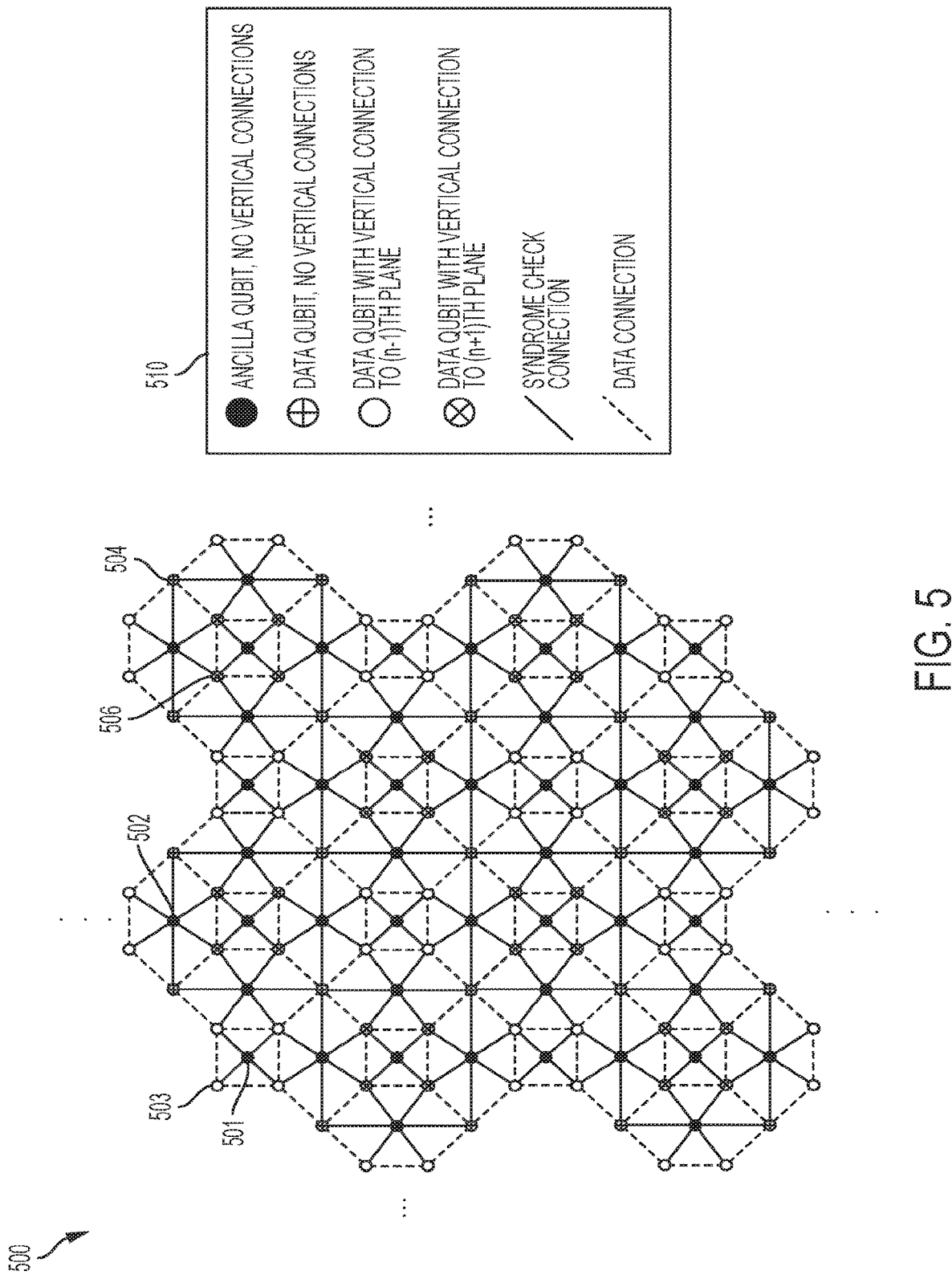
FIG. 5 is a diagram of an example of a two-dimensional device lattice in a quantum processor cell.

FIG. 5 is a diagram of an example of a two-dimensional device lattice 500 of a quantum processor cell. The example two-dimensional device lattice 500 shown in FIG. 5 forms an individual layer within a larger three-dimensional device lattice. For example, multiple copies of the two-dimensional device lattice 500 can be assembled in a vertical direction (perpendicular to the two-dimensional lattice plane) to form the three-dimensional device lattice, with each copy of the two-dimensional device lattice 500 forming an individual layer.

The example two-dimensional device lattice 500 shown in FIG. 5 includes ancilla qubit devices, data qubit devices and connections between the various qubit devices. The legend 510 indicates the types of qubit devices and connections. The ancilla qubit devices (e.g., ancilla qubit devices 501, 502), represented as black circles in FIG. 5, are not directly connected with another layer in the three-dimensional device lattice. The data qubit devices that are represented as unfilled circles in FIG. 5 (e.g., data qubit device 503) and the data qubit devices that are represented as x-circles ("⊗") in FIG. 5 (e.g., data qubit device 506) are directly connected with a data qubit in another layer in the three-dimensional device lattice. In particular, if the two-dimensional device lattice 500 is considered as the n-th layer in the three-dimensional device lattice, then the data qubit represented as unfilled circles are directly connected to a data qubit in the (n−1)-th layer in the three-dimensional device lattice, and the data qubit devices represented as x-circles are directly connected to a data qubit in the (n+1)-th layer in the three-dimensional device lattice. The data qubit devices that are represented as plus-circles ("⊕") in FIG. 5 (e.g., data qubit device 504) are not directly connected with a data qubit in another layer in the three-dimensional device lattice. The solid lines in FIG. 5 represent connections between qubit devices that can be used to perform syndrome checks in the color code. The dashed lines in FIG. 5 represent connections between qubit devices that can be used to perform data operations (e.g., two-qubit quantum logic gates). In the example shown in FIG. 5, the direct data connections between neighboring data qubit devices do not include another type of device between them.

In some implementations, the example three-dimensional gauge color code 300 shown in FIG. 3 can be applied to a three-dimensional device lattice formed from multiple layers of the two-dimensional device lattice 500. In such implementations, the ancilla qubits (e.g., the ancilla qubit device 502) can be placed at the center of the gauge operators. In some cases, multiple copies of another type of two-dimensional device lattice can be assembled to form a three-dimensional device lattice to which the other example three-dimensional gauge color code 400 shown in FIG. 4 can be applied.

Figure 6:
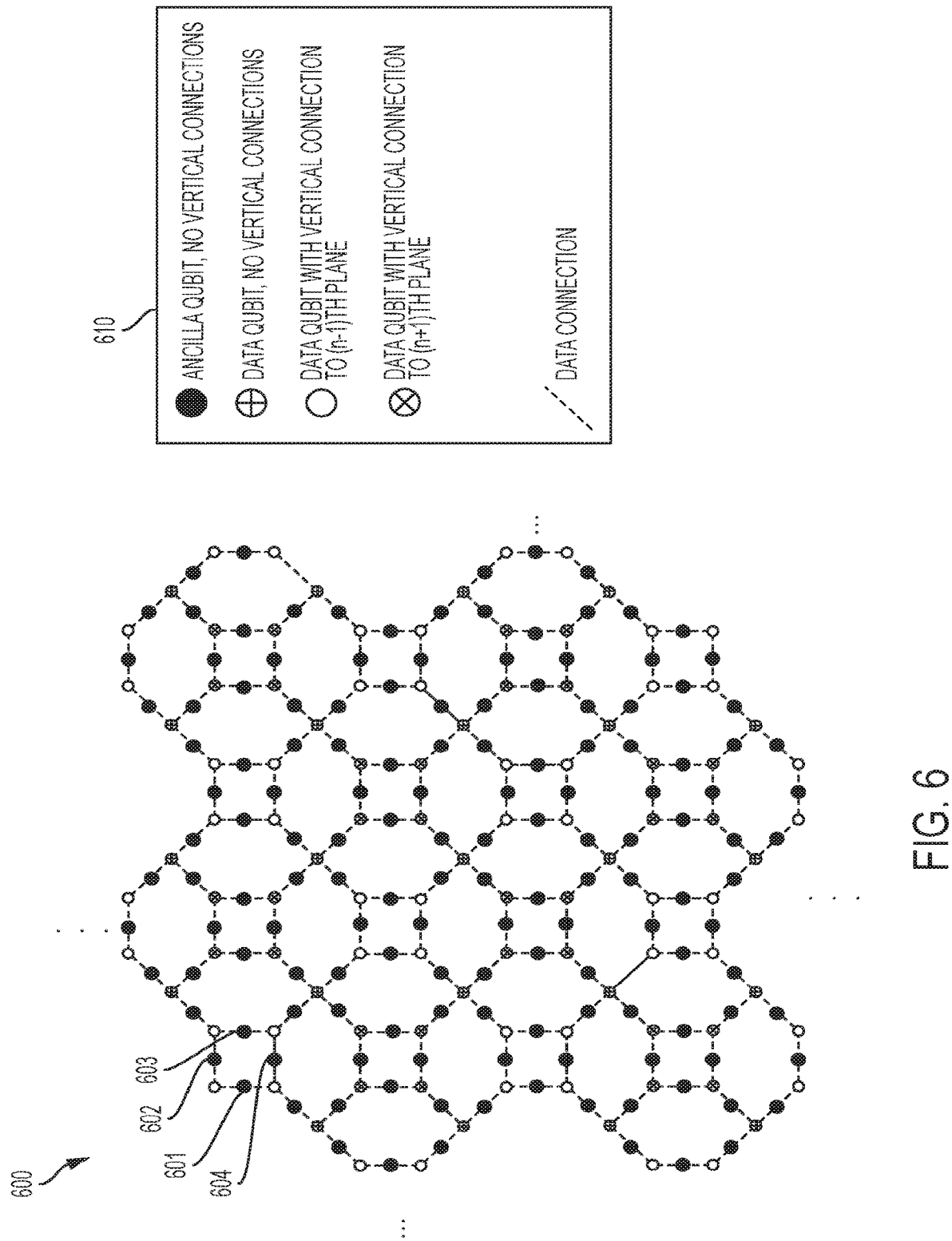
FIG. 6 is a diagram of another example of a two-dimensional device lattice in a quantum processor cell.

FIG. 6 is a diagram of another example of a two-dimensional device lattice 600 of a quantum processor cell. The example two-dimensional device lattice 600 shown in FIG. 6 forms an individual layer within a larger three-dimensional device lattice. For example, multiple copies of the two-dimensional device lattice 600 can be assembled in a vertical direction (perpendicular to the two-dimensional lattice plane) to form the three-dimensional device lattice, with each copy of the two-dimensional device lattice 600 forming an individual layer.

The example two-dimensional device lattice 600 shown in FIG. 6 includes ancilla qubit devices, data qubit devices and connections between the various qubit devices. The legend 610 indicates the types of qubit devices and connections, with the same meaning as in FIG. 5.

The arrangement of the data qubit devices in the example two-dimensional device lattice 600 shown in FIG. 6 is the same as the arrangement of the data qubit devices in the example two-dimensional device lattice 500 shown in FIG. 5. However, the ancilla qubit devices are arranged in different locations in the example two-dimensional device lattices 500 and 600. In particular, the positions of the ancilla qubit devices in FIG. 5 correspond to the centers of the color faces in the example three-dimensional gauge color code 300 shown in FIG. 3; and the positions of the ancilla qubit devices in FIG. 6 (e.g., ancilla qubit devices 601, 602, 603, 604) correspond to the centers of the lattice edges in the example three-dimensional gauge color code 300 shown in FIG. 3. Accordingly, the ancilla qubit devices in FIG. 5 can operate on respective faces of the example three-dimensional gauge color code 300 shown in FIG. 3; and the ancilla qubit devices in FIG. 6 can operate on respective edges in the example three-dimensional gauge color code 300 shown in FIG. 3. The ancilla qubit devices can also be placed between data qubit devices in different layers of the three-dimensional device lattice formed from multiple copies of the two-dimensional device lattice 600. In some implementations, the ancilla qubit devices can also act as coupler devices for performing quantum logic operations between the data qubits.

In the example shown in FIG. 6, the direct data connections between neighboring pairs of data qubits include ancilla qubit devices. In some instances, an ancilla qubit device in FIG. 6 can operate as a coupler device, for example, to implement two-qubit gates on the pair of neighboring data qubits that are adjacent to the ancilla qubit device.

FIG. 5 and FIG. 6. show two examples of how the ancilla qubit devices can be arranged in two-dimensional device lattices. Other arrangements of ancilla qubit devices can be implemented, including designs that mix ancillas placed on some color faces and ancillas placed on some lattice edges, designs that place two or more ancillas on some lattice edges or color faces, or other combinations.

Figure 7:
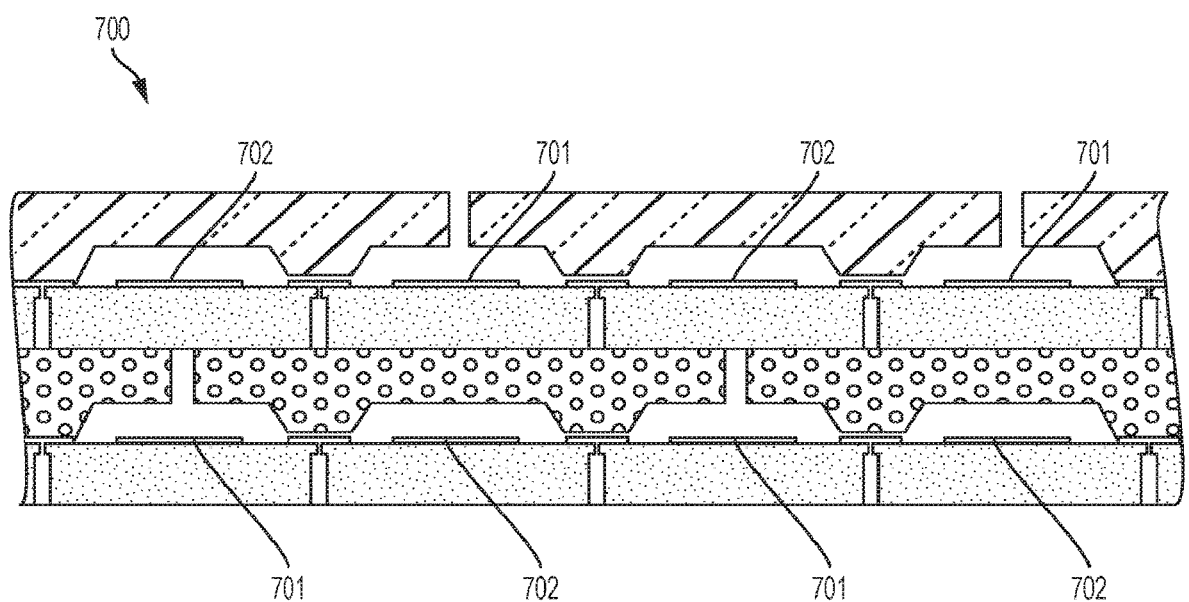
FIG. 7 is a diagram of an example three-dimensional device lattice.

FIG. 7 is a diagram of an example three-dimensional device lattice 700. In this example, the three-dimensional device lattice 700 includes qubit devices, some of which operate as data qubit devices 702 and others operate as ancilla qubit devices 701. In some implementations, the three-dimensional device lattice 700 includes a superconducting quantum circuit that includes the ancilla qubit devices 701, the data qubit devices 702 and other devices. In some instances, the ancilla qubit devices 701 may also operate as coupler devices for performing quantum logic operations, for example, on pairs of the data qubit devices 702.

The qubit devices in the example three-dimensional device lattice 700 are arranged in multiple layers, where each layer includes a two-dimensional device lattice. In the example shown in FIG. 7, the qubit devices can be connected in-plane to other qubit devices in the same layer through a superconducting quantum circuit defined on a substrate that supports the qubits; some of the qubit devices are also connected out-of-plane to another qubit device in a different layer, for example, by superconducting vias that extend through a substrate between the layers. The qubit devices can be connected in another manner.

Example hardware arrangements and techniques for operating a multi-dimensional device lattice are described in PCT Publication Pub. WO2015/178990, titled "Housing Qubit Devices In An Electromagnetic Waveguide System." A three-dimensional device lattice may be implemented using another type of hardware or another arrangement of the example hardware shown in FIG. 7.

Figure 8:
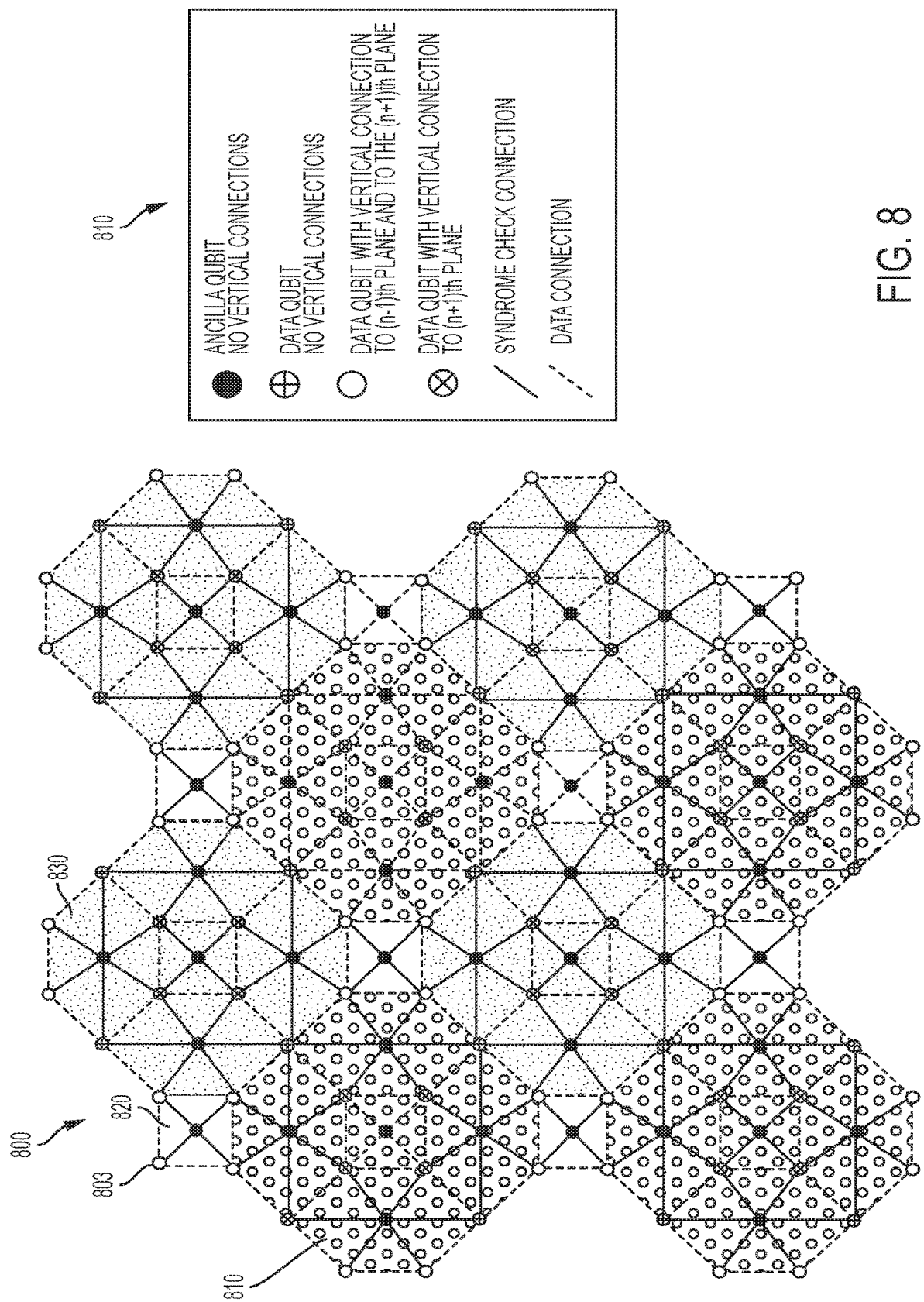
FIG. 8 is a diagram of an example operating regime for an example two-dimensional device lattice.

FIG. 8 is a diagram of an example operating regime for an example two-dimensional device lattice 800. The example three-dimensional gauge color code 300 shown in FIG. 3 can be applied to a three-dimensional lattice formed from multiple layers of the two-dimensional device lattice 800 in FIG. 8. As shown in FIG. 8, a two-dimensional color code can be applied to an individual two-dimensional device lattice.

The example two-dimensional device lattice 800 shown in FIG. 8 includes ancilla qubit devices, data qubit devices and connections between the various qubit devices. The legend 810 indicates the types of qubit devices and connections in FIG. 8. The two-dimensional device lattice 800 shown in FIG. 8 is like the two-dimensional device lattice 500 shown in FIG. 5, except that the data qubits represented as unfilled circles (e.g., data qubit 803) in FIG. 8 are directly connected with data qubits in two other layers. In particular, if the two-dimensional device lattice 800 is considered as the n-th layer in the three-dimensional device lattice, then the data qubit devices represented as unfilled circles in FIG. 8 are directly connected to a data qubit in the (n−1)-th layer and to a data qubit in the (n+1)-th layer in the three-dimensional device lattice. All other connections in the two-dimensional device lattice 800 shown in FIG. 8 are the same as in the two-dimensional device lattice 500 shown in FIG. 5.

FIG. 8 shows the three types of color faces in an example two-dimensional gauge color code. The three types of color faces are represented by the three types of background in the lattice in FIG. 8. In the example shown, a first set of faces (e.g., square region 820) are represented by the white (unshaded) background; a second set of faces (e.g., octagonal region 810) are represented by the circle-patterned background; and a third set of faces (e.g., octagonal region 830) are represented by stippled background. The color faces can act as the gauge operators for the gauge color code.

In the example shown in FIG. 8, the stabilizers of the two-dimensional color code are given by the three types of color faces. For example, the first set of faces (e.g., square region 820) can correspond to a red stabilizer; the second set of faces (e.g., octagonal region 810) can correspond to a blue stabilizer; and a third set of faces (e.g., octagonal region 830) can correspond to a green stabilizer.

The example two-dimensional color code shown in FIG. 8 can be applied to qubit devices that form a three-colorable, three-valent, two-dimensional device lattice. For example, the two-dimensional color code can be applied to the subset of data qubits that have vertical connections to the planes above and beneath them; in particular, the data qubit devices that are represented by unfilled circles in FIG. 8 (e.g., data qubit device 803) form a subset of qubits in a two-dimensional device lattice to which a two-dimensional color code can be applied. In some cases, the two-dimensional color code can be applied to another sub-lattice or another subset of qubit devices within a layer of a three-dimensional device lattice. In some cases, the two-dimensional color code shown in FIG. 8 can be adapted for application to qubits in the example two-dimensional lattice 600 shown in FIG. 6 or another two-dimensional device lattice.

Figure 9:
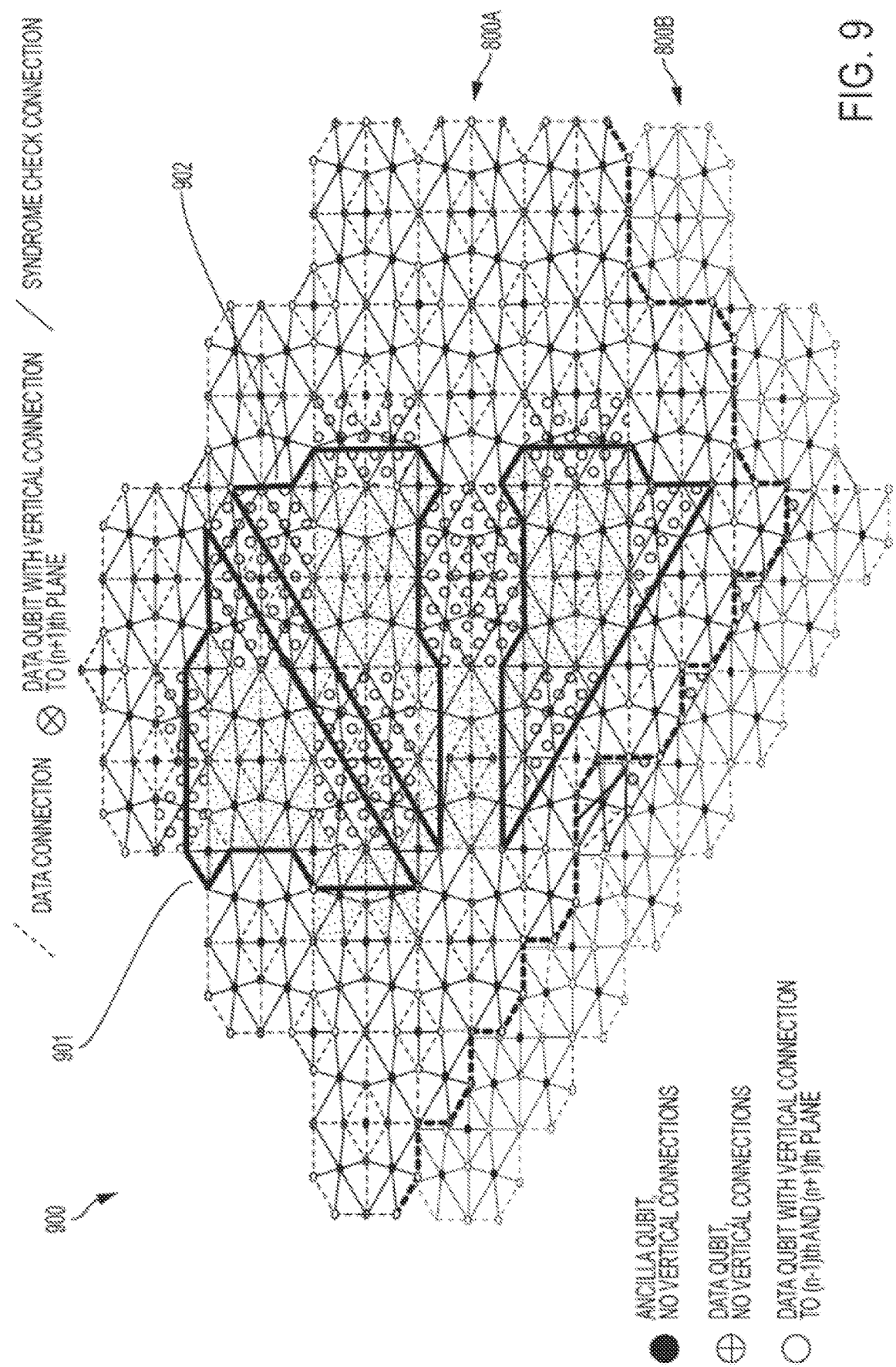
FIG. 9 is a diagram of an example of encoded two qubit operations via lattice surgery in a layer of an example three-dimensional device lattice.

FIG. 9 is a diagram of an example of encoded two qubit operations via lattice surgery in a layer of an example three-dimensional device lattice 900. The example three-dimensional device lattice 900 includes multiple layers; two of the layers are shown in FIG. 9. As shown in FIG. 9, a first layer of the three-dimensional device lattice 900 includes a two-dimensional device lattice 800A, and a second layer of the three-dimensional device lattice 900 includes another two-dimensional device lattice 800B. Each of the two-dimensional device lattices 800A and 800B shown in FIG. 9 is configured according to the example two-dimensional device lattice 800 shown in FIG. 8. The three-dimensional device lattice 900 may include additional layers, and the layers shown in FIG. 9 may extend further to include additional devices.

In the example shown in FIG. 9, the data qubit devices in a first region 901 of the two-dimensional device lattice 800A are used to encode a first logical qubit, and the data qubit devices in a second region 902 of the two-dimensional device lattice 800A are used to encode a second logical qubit. The first and second regions 901, 902 each include the devices residing along and within their respective boundary lines shown in FIG. 9.

In some implementations, the first and second regions 901, 902 in FIG. 9 can be used to encode quantum information in a two-dimensional color code. In some cases, the two-dimensional size of the regions 901, 902 can be determined based on a required code distance. The distance of a quantum error correcting code may refer, for example, to a minimum number of qubits that a noise operator must apply to in order to create a logical error in the code. For example, the two-dimensional color code described with respect to FIG. 8 can be implemented in the first and second regions 901, 902 in FIG. 9, with a code distance of five. The background in and about the boundary lines in FIG. 9 corresponds to the color faces for the two-dimensional color code represented in FIG. 8. In the example shown in FIG. 9, each region 901, 902 can be used to encode a single logical qubit and the spatial position of the region within the lattice, as well as its size and code distance, can be dynamically allocated, for example, during the operation of a quantum processor cell.

Figure 11A:
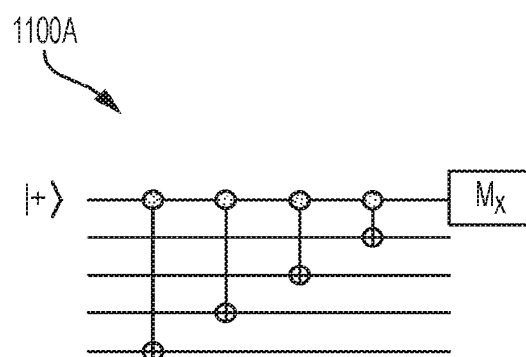
FIG. 11A is a diagram showing an example quantum circuit for X syndrome extraction.

FIG. 11A is a diagram showing an example quantum circuit 1100A for X syndrome extraction in a quantum error correcting code. The example quantum circuit 1100A can be applied to an ancilla qubit and four data qubits. In some color codes, an X syndrome extraction is applied to more than one ancilla qubit, or an X syndrome extraction is applied to more or fewer than four data qubits. In the example shown in FIG. 11A, an ancilla qubit is prepared in the |+⟩ state, and then controlled-not gates are applied between the ancilla qubits and each of the data qubits in the stabilizer or gauge operator. In the example shown in FIG. 11A, in each controlled-not gate, the ancilla qubit acts as the control for the conditional NOT operation, and the data qubit acts as the target for the conditional NOT operation. The ancilla qubit can then be measured in the X basis to extract the X error syndrome. In some quantum error correcting codes, a similar process can be applied across multiple (e.g., all or a subset of all) ancilla qubits in parallel.

Figure 11B:
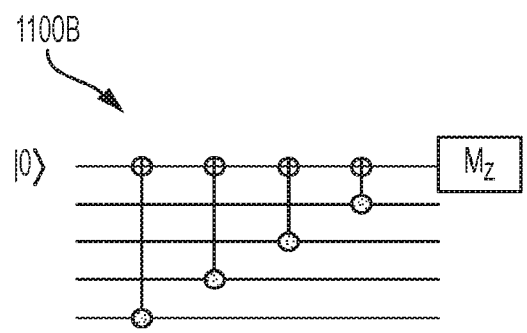
FIG. 11B is a diagram showing an example quantum circuit for Z syndrome extraction.

FIG. 11B is a diagram showing an example quantum circuit 1100B for Z syndrome extraction in a quantum error correcting code. The example quantum circuit 1100B can be applied to an ancilla qubit and four data qubits. In some color codes, a Z syndrome extraction is applied to more than one ancilla qubit, or an X syndrome extraction is applied to more or fewer than four data qubits. In the example shown in FIG. 11B, an ancilla qubit is prepared in the |0⟩ state, and then controlled-not gates are applied between the ancilla qubits and each of the data qubits in the stabilizer or gauge operator. In the example shown in FIG. 11B, in each controlled-not gate, the data qubit acts as the control for the conditional NOT operation, and the ancilla qubit acts as the target for the conditional NOT operation. The ancilla qubit can then be measured in the Z basis to extract the Z error syndrome. In some quantum error correcting codes, a similar process can be applied across multiple (e.g., all or a subset of all) ancilla qubits in parallel.

Figure 10:
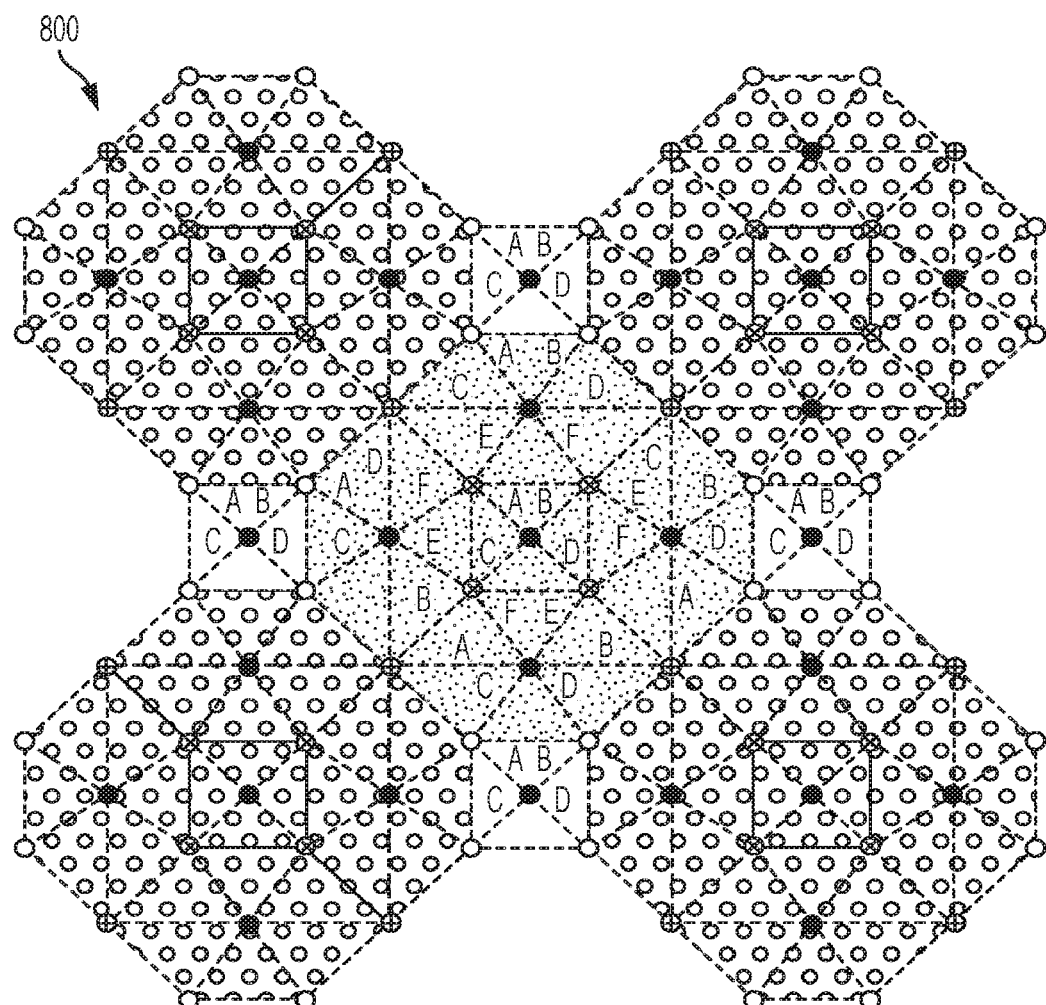
FIG. 10 is a diagram of an example error syndrome extraction scheme in the example two-dimensional device lattice 800 shown in FIG. 8.

FIG. 10 is a diagram showing an example error syndrome extraction scheme in the example two-dimensional device lattice 800 shown in FIG. 8. The error syndrome extraction scheme shown in FIG. 10 can be used for X syndrome extraction, Z syndrome extraction or another type of syndrome extraction operation in some cases. The example error syndrome extraction scheme represented in FIG. 10 includes six groups of operations that can be performed, for example, in a sequence of time steps (e.g., six time steps). In each group of operations in the error syndrome extraction scheme, controlled-not gates are applied between pairs of qubits, analogous to the controlled-not gates shown in FIGS. 11A and 11B, where each controlled-not gate is applied to an ancilla qubit and a data qubit.

The letters (A, B, C, D, E and F) along various qubit connections in FIG. 10 correspond to the six groups of operations in the error syndrome extraction scheme. In particular, the letter "A" indicates the subset of connections where controlled-not gates are applied in the first group of operations; the letter "B" indicates the subset of connections where controlled-not gates are applied in the second group of operations; the letter "C" indicates the subset of connections where controlled-not gates are applied in the third group of operations; the letter "D" indicates the subset of connections where controlled-not gates are applied in the fourth group of operations; the letter "E" indicates the subset of connections where controlled-not gates are applied in the fifth group of operations; and the letter "F" indicates the subset of connections where controlled-not gates are applied in the sixth group of operations.

In some implementations, the groups of operations can be applied in various sequences or in parallel. For example, all of the two-qubit gate operations cannot necessarily be applied during a single time step. In some instances, the six groups of operations can be scheduled over six time steps, with the controlled-not gates in the groups of operations being performed in respective time steps. For example, in time step 1, the controlled-not gates can be applied across the connections labelled "A," in time step 2, the controlled-not gates can be applied across the connections labelled "B," and so forth for the controlled-not gates across the connections labelled "C," "D," "E," and "F." The groups of operations may be performed in another order, and other scheduling schemes can be used for the error syndrome extraction scheme.

FIG. 12 includes two flow charts showing example processes 1201, 1202 for dimensional reduction of an error correcting code. The example processes 1201, 1202 can be used convert a three-dimensional color code to a two-dimensional color code on one of the faces of the three-dimensional color code. For example, the example process 1201 can be used to convert the three-dimensional gauge color code 300 shown in FIG. 3 to a two-dimensional color code applied to an individual two-dimensional face of the three-dimensional gauge color code 300.

At 1210, a three-dimensional quantum error correcting code (a "3D code") is applied to a three-dimensional device lattice. At 1211, a target side of the 3D code is chosen. The target side of the 3D code can be a face of the 3D code that will be reduced to a two-dimensional quantum error correcting code (the "2D code"). At 1212, a gauge syndrome is measured on all the other data qubits in the 3D code that are not in the target side; these data qubits can be referred to as the inner colex. The stabilizer syndrome for the inner colex can then be recovered as it would be recovered for the 3D code. For instance, a stabilizer for the whole 3D code may be a product of a stabilizer for the inner colex and a stabilizer for the target side. At 1213, the target side's 2D syndrome is inferred. For example, a stabilizer for the target side can be recovered as one whose product with the stabilizer of the inner colex is consistent with a stabilizer result for the whole 3D code. At 1214, the data qubits that are not on the target side (the qubits in the inner colex) are dropped or deallocated from the code. At 1215, a two-dimensional quantum error correcting code (a "2D code") is applied to the qubits in the target side of the 3D code. In some implementations, the example process 1201 can fault-tolerantly transfer the information from the 3D code operated at 1210 onto the two-dimensional target side of the 3D code.

At 1220, a three-dimensional quantum error correcting code (a "3D code") is applied to a three-dimensional device lattice. At 1221, a target side or face of the 3D code has been chosen for dimensional reduction. In some examples, a property of the 3D code is that each of the four boundary faces of the 3D code has an intrinsic color. Let the target side that has been chosen at 1221 be colored C. All data qubits that are in the 3D code, but that are not on the target side can be referred to as the inner colex. At 1221, destructive measurements are made of all the data qubits in the inner colex that are colored C. At 1222, the results of this destructive measurement can be combined with stabilizer results from the 3D code operation to infer the 2D color code syndrome for just the target face. At 1223, the qubits in the inner colex are deallocated, and a two-dimensional quantum error correcting code (a "2D code") is applied to the qubits in the target side of the 3D code. In some implementations, the example process 1202 can fault-tolerantly transfer the information from the 3D code operated at 1220 onto the two-dimensional target side of the 3D code.

FIG. 13 is a flow chart showing an example process 1300 for dimensional extension. At 1301, a two-dimensional quantum error correcting code (a "2D code") is applied to a two-dimensional device lattice. At 1302, neighboring qubits in other device layers are allocated to be used in a three-dimensional quantum error correcting code (a "3D code"). At 1303, stabilizer or gauge operator measurements (or both) are implemented so that the 2D code resides on a face of the resulting 3D code. At 1304, the 3D code is operated. In some implementations, the example process 1300 can fault-tolerantly transfer the information from the 2D code operated at 1301 into the 3D code.

Figure 16:
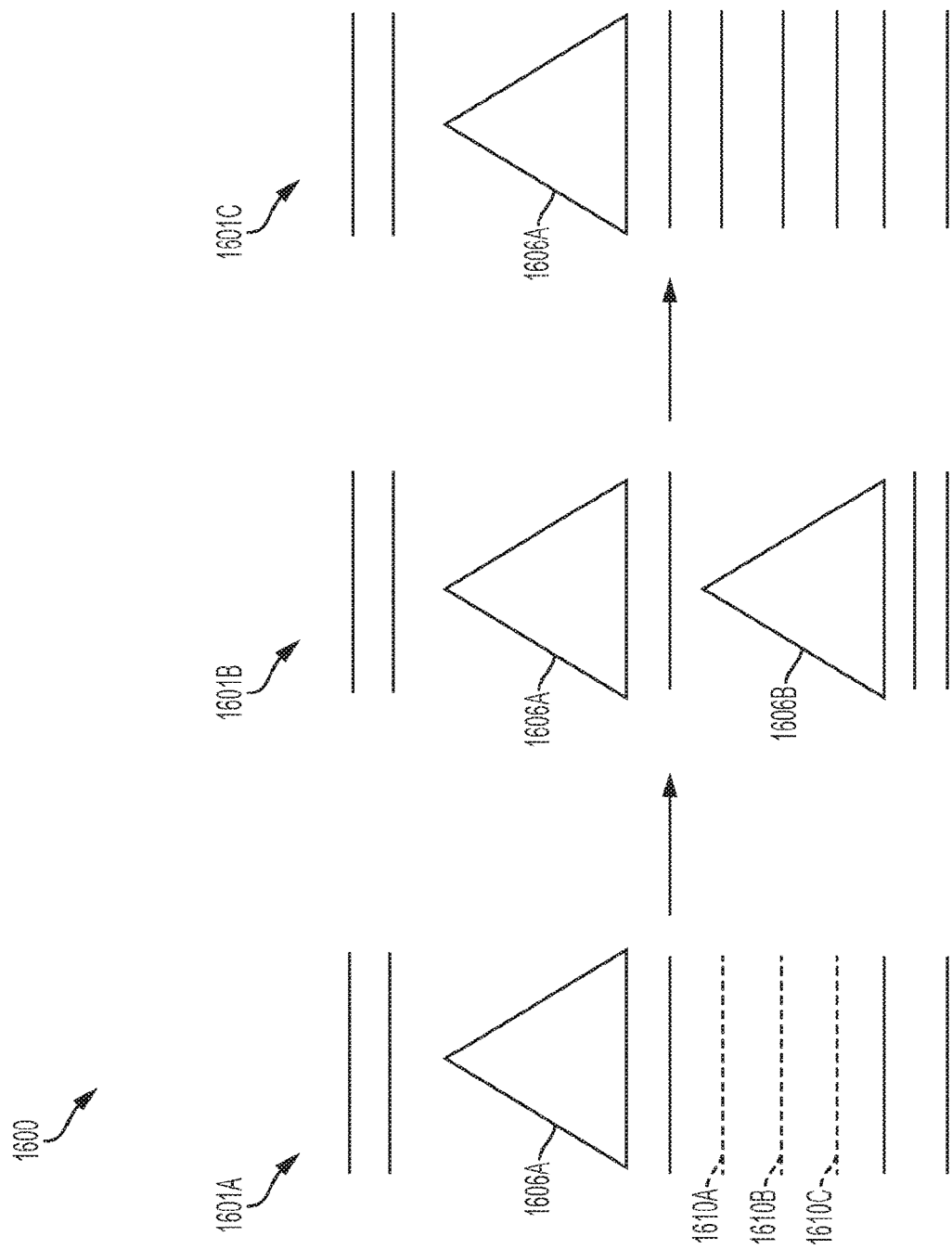
FIG. 16 is a block diagram showing dynamic allocation of functional operating regions in an example quantum processor cell.

FIG. 16 is a block diagram 1600 showing dynamic allocation of functional operating regions in an example quantum processor cell. In particular, the block diagram 1600 shows a stack, such as the stack 201 shown in FIG. 2, in three modes of operation. In the first mode of operation 1601A, the stack includes a cap region 1606A and multiple planes, including three planes 1610A, 1610B and 1610C below the cap region 1606A. In the second mode of operation 1601B, the stack includes two cap regions 1606A and 1606B. Between the first mode of operation 1601A and the second mode of operation 1601B, the three planes 1610A, 1610B and 1610C have been reallocated to define the cap region 1606B. In the third mode of operation 1601C, the stack includes one cap region 1606A, and the cap region 1606B has been reallocated to define three planes in the stack. In some implementations, the example process 1300 shown in FIG. 13 can be used (e.g., between the first and second modes of operation 1601A, 1601B) to fault-tolerantly transfer quantum information from the planes 1610A, 1610B, 1610C to the cap region 1601B, and the example processes shown in FIG. 12 can be used to implement the dimensional reduction procedure that allocates or deallocates qubits in the cap region 1606B. A different number of layers can be used to dimensionally extend a two-dimensional code into a three-dimensional code. In some implementations, N two-dimensional layers are used to extend to a three-dimensional code that has code distance N. In some implementations, regions of three- or two-dimensional codes can be dynamically allocated during the course of a computation or can be specified beforehand.

FIG. 14 includes three flow charts showing example processes 1400, 1410, 1420 for performing quantum logic gates encoded in a three-dimensional operating mode of a quantum processor cell. In some implementations, the example process 1400 can execute a fault-tolerant logical Hadamard gate, the example process 1410 can execute a fault-tolerant T gate, and the example process 1420 can execute a fault-tolerant controlled-not gate.

At 1401, a three-dimensional quantum error correcting code (a "3D code") is applied to a three-dimensional device lattice. At 1402 a Hadamard gate is applied to all data qubits in the 3D code. At 1403, the 3D code is applied. In some implementations, the process 1401 applies a fault-tolerant Hadamard gate to a logical qubit stored in the 3D code.

At 1411, a three-dimensional quantum error correcting code (a "3D code") is applied to a three-dimensional device lattice. At 1412, a gauge fixing procedure is applied by first measuring the Z-type stabilizers of the 3D code. Should one of these operators return an error, an X operator is applied to that gauge. In the example shown, the gauge fixing procedure is fault-tolerant as it is measuring stabilizers only. At 1413, the data qubits of the 3D code are bipartitioned into sets Q and $Q^C$ such that each qubit in Q is only coupled to qubits in $Q^C$ and vice versa. At 1414, a rotation gate $T^k$ is applied to each data qubit in Q and a rotation $T^{-k}$ is applied to each qubit in $Q^C$, where k is a solution to $k(|Q|-|Q^C|) \equiv 1$ mod 2n and $T^k$ means k repetitions of T and $T^{-k}$ is k repetitions of the inverse T gate. At 1415, the 3D code is applied to the device lattice. In some implementations, the process 1410 applies a fault-tolerant T gate to a logical qubit encoded in the 3D code.

In some instances, the example process 1420 may apply fault-tolerant controlled-not gates that start and end with logical qubits encoded in either three-dimensional or two-dimensional codes. At 1421, a three-dimensional quantum error correcting code (a "3D code") is applied to a three-dimensional device lattice. At 1423, dimensional reduction is used to transfer the logical qubit to a two-dimensional code. At 1425, a transversal CNOT gate can then be applied. The transversal CNOT can apply a controlled-not gate between data qubits of two 2D codes that operate on different layers. At 1427, this two-dimensional code can then be extended back to a three-dimensional code.

At 1422, a two-dimensional quantum error correcting code (the "2D code") is applied to a two-dimensional device lattice. Fault-tolerant controlled-not gates can be applied transversally between neighboring logical qubits via either a transversal CNOT or color code lattice surgery or another method. At 1425, a transversal CNOT is applied to two-dimensional color codes on neighboring layers. At 1424a, non-neighboring two-dimensional logical qubits can be swapped into neighboring layers using a fault-tolerant SWAP gate comprising three concatenated fault-tolerant controlled-not gates. At 1424b, the logical qubit can be swapped back to its original location using further fault-tolerant SWAP gates. In some implementations, the process 1420 can be used to apply a fault-tolerant controlled-not gate to logical qubits in 2D and 3D codes of the device lattice.

FIG. 15 includes three flow charts showing example processes 1500, 1510, 1520 for performing quantum logic gates encoded in a two-dimensional operating mode of a quantum processor cell. In some implementations the process 1500 can be used to apply a fault-tolerant Hadamard gate to a logical qubit encoded in a two-dimensional device lattice. At 1501, a two-dimensional quantum error correcting code (a "2D code") is applied to a two-dimensional device lattice. At 1502, a Hadamard gate is applied to all the data qubits in the 2D code. At 1503, the 2D code is applied to the two-dimensional device lattice.

In some implementations, the process 1510 can apply a fault-tolerant T gate to a logical qubit encoded in a two-dimensional device lattice. At 1511, a two-dimensional code is applied to a two-dimensional device lattice. At 1512, a two-dimensional encoded qubit can be moved, for example, via encoded SWAP gates, near a region where qubits can be allocated for dimensional extension to a 3D code. At 1513, dimensional extension is used to encoded the two-dimensional qubit into a three-dimensional region of the device lattice. At 1514, an encoded T gate is applied to the three-dimensional region, for example using the process 1410 shown in FIG. 14 or another process. At 1515, dimensional reduction is used to return the 3D code to a 2D code. At 1516, the 2D code can be optionally moved throughout the lattice using SWAP gates. At 1517, the 2D code is operated in its original location in the lattice.

In some implementations, the process 1520 can be used to fault-tolerantly perform a CNOT gate between two qubits encoded in different 2D codes. At 1521, two two-dimensional codes are applied to two neighboring layers of the device lattice. At 1522, a controlled-not gate is applied vertically between the two layers. At 1523, a two-dimensional code is applied to the two-dimensional device layers.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device, e.g., a phone, an electronic appliance, a mobile audio or video player, a game console, a Global Positioning System (GPS) receiver, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In a general aspect of the subject matter described above, quantum computing can be performed in a three-dimensional device lattice.

In a first example, information is encoded in data qubits in a three-dimensional device lattice. The data qubits reside in multiple layers of the three-dimensional device lattice, and each layer includes a respective two-dimensional device lattice. A three-dimensional color code is applied in the three-dimensional device lattice to detect errors in the data qubits residing in the multiple layers. A two-dimensional color code is applied in the two-dimensional device lattice in each respective layer to detect errors in one or more of the data qubits residing in the respective layer.

Implementations of the first example may include one or more of the following features. Applying the three-dimensional color code can include operating ancilla qubits. Each of the ancilla qubit devices may operate on a respective face or a respective edge of the three-dimensional color code. The three-dimensional color code and the two-dimensional color code can be applied to operate the data qubits in a universal fault-tolerant quantum computing regime.

In a second example, a quantum computing system includes a quantum processor cell. The quantum processor cell includes a three-dimensional device lattice having multiple layers of qubit devices. Each layer includes a respective two-dimensional device lattice. The three-dimensional device lattice includes a four-colorable, four-valent arrangement of the qubit devices. The two-dimensional device lattice of each layer includes a three-colorable, three-valent arrangement of a subset of the qubit devices in the layer.

Implementations of the second example may include one or more of the following features. The qubit devices can be data qubit devices, and the quantum processor cell can further include ancilla qubit devices. Each of the ancilla qubit devices may be configured to operate on a respective face or edge of a three-dimensional color code. The quantum processor cell includes a superconducting quantum circuit that includes the qubit devices. Each of the layers includes the same three-colorable, three-valent arrangement. The quantum computing system includes a control system communicably coupled to the quantum processor cell and configured to operate the qubit devices.

In a third example, a quantum computing system includes a three-dimensional device lattice and a control system. The three-dimensional device lattice includes multiple layers of data qubit devices. Each layer includes a respective two-dimensional device lattice. The control system is communicably coupled to the quantum processor cell and configured to perform operations on the data qubits. The operations include encoding information in the data qubits; applying a three-dimensional color code in the three-dimensional device lattice to detect errors in the data qubits residing in the multiple layers; and applying a two-dimensional color code in the two-dimensional device lattice in each respective layer to detect errors in one or more of the data qubits residing in the respective layer.

Implementations of the third example may include one or more of the following features. The three-dimensional device lattice can include a four-colorable, four-valent arrangement of the data qubit devices. The two-dimensional device lattice of each layer can include a three-colorable, three-valent arrangement of a subset of the data qubit devices in the layer. The three-dimensional device lattice further includes ancilla qubit devices. The quantum computing system can include a signal delivery system that transfers signals between the three-dimensional device lattice and the control system. Applying the three-dimensional color code can include operating ancilla qubit devices in the three-dimensional device lattice. The quantum computing system includes a quantum processor cell that houses the three-dimensional device lattice. The three-dimensional device lattice can be a sub-lattice of a larger three-dimensional device lattice housed in the quantum processor cell.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A quantum computing system comprising:
   a three-dimensional device lattice comprising multiple layers of qubit devices, each layer comprising a respective two-dimensional device lattice, and the two-dimensional device lattice in each layer comprising:
      a first subset of qubit devices connected to devices in a first, distinct layer through out-of-plane connections extending in a first direction;
      a second subset of qubit devices connected to devices in a second, distinct layer through out-of-plane connections extending in a second, opposite direction; and
      a third subset of qubit devices that have only in-plane connections; and
   a control system communicably coupled to the three-dimensional device lattice and configured to control the qubit devices in the three-dimensional device lattice.

2. The quantum computing system of claim 1, wherein the three-dimensional device lattice comprises data qubit devices and ancilla qubit devices in each layer.

3. The quantum computing system of claim 2, wherein each of the ancilla qubit devices in each layer is connected to data qubit devices in the same layer through respective in-plane connections.

4. The quantum computing system of claim 2, wherein an ancilla qubit device is connected to respective data qubit devices through respective in-plane connections; and the control system is configured to operate the ancilla qubit device as a coupler device for performing quantum logic operation between the respective data qubit devices.

5. The quantum computing system of claim 3, wherein the respective in-plane connections between the ancilla qubit device and the respective data qubit devices comprises syndrome check connections.

6. The quantum computing system of claim 1, further comprising a signal delivery system that transfers signals between the three-dimensional device lattice and the control system.

7. The quantum computing system of claim 1, comprising a quantum processor cell, wherein the three-dimensional device lattice is housed in the quantum processor cell.

8. The quantum computing system of claim 7, wherein the three-dimensional device lattice comprises a sub-lattice of a larger three-dimensional device lattice housed in the quantum processor cell.

9. The quantum computing system of claim 1, wherein each of the in-plane connections comprises a superconducting quantum circuit on a substrate supporting the qubit devices in the same layer.

10. The quantum computing system of claim 1, wherein each of the out-of-plane connections comprises a superconducting via extending through a substrate between the layer and one of the first and second layers.

11. The quantum computing system of claim 1, wherein one of either the first subset or the second subset of qubit devices are connected to:
   devices in the first, distinct layer through out-of-plane connections extending in the first direction; and devices in the second, distinct layer through out-of-plane connections extending in the second, opposite direction.

12. The quantum computing system of claim 1, wherein respective out-of-plane connections of a layer extending in the first and second directions are perpendicular to the respective two-dimensional device lattice in the layer.

13. The quantum computing system of claim 1, wherein the two-dimensional device lattice in each layer is parallel with two-dimensional device lattices in the respective first and second layers.

14. The quantum computing system of claim 1, wherein the out-of-plane connections and the in-plane connections comprise data connections.

15. A quantum computing method for operating a quantum computing system, the quantum computing system comprising:
a control system; and
a three-dimensional device lattice comprising multiple layers of qubit devices, each layer comprising a respective two-dimensional device lattice, and the two-dimensional device lattice in each layer comprising:
a first subset of qubit devices connected to devices in a first, distinct layer through out-of-plane connections extending in a first direction;
a second subset of qubit devices connected to devices in a second, distinct layer through out-of-plane connections extending in a second, opposite direction; and
a third subset of qubit devices that have only in-plane connections,
the method comprising, by operation of the control system, controlling the qubit devices in the three-dimensional device lattice.

16. The quantum computing method of claim 15, wherein the three-dimensional device lattice comprises data qubit devices and ancilla qubit devices in each layer.

17. The quantum computing method of claim 16, wherein each of the ancilla qubit devices in each layer is connected to data qubit devices in the same layer through respective in-plane connections.

18. The quantum computing method of claim 16, wherein an ancilla qubit device is connected to respective data qubit devices through respective in-plane connections; and the control system is configured to operate the ancilla qubit device as a coupler device for performing quantum logic operation between the respective data qubit devices.

19. The quantum computing method of claim 18, wherein the respective in-plane connections between the ancilla qubit device and the respective data qubit devices comprises syndrome check connections.

20. The quantum computing method of claim 15, wherein the quantum computing system further comprises a signal delivery system that transfers signals between the three-dimensional device lattice and the control system.

21. The quantum computing method of claim 15, wherein the quantum computing system comprises a quantum processor cell and the three-dimensional device lattice is housed in the quantum processor cell.

22. The quantum computing method of claim 21, wherein the three-dimensional device lattice comprises a sub-lattice of a larger three-dimensional device lattice housed in the quantum processor cell.

23. The quantum computing method of claim 15, wherein each of the in-plane connections comprises a superconducting quantum circuit on a substrate supporting the qubit devices in the same layer.

24. The quantum computing method of claim 15, wherein each of the out-of-plane connections comprises a superconducting via extending through a substrate between the layer and one of the first and second layers.

25. The quantum computing method of claim 15, wherein one of either the first subset or the second subset of qubit devices are connected to:
devices in the first, distinct layer through out-of-plane connections extending in the first direction; and
devices in the second, distinct layer through out-of-plane connections extending in the second, opposite direction.

26. The quantum computing method of claim 15, wherein respective out-of-plane connections of a layer extending in the first and second directions are perpendicular to the respective two-dimensional device lattice in the layer.

27. The quantum computing method of claim 15, wherein the two-dimensional device lattice in each layer is parallel with two-dimensional device lattices in the respective first and second layers.

28. The quantum computing method of claim 15, wherein the out-of-plane connections and the in-plane connections comprise data connections.

* * * * *